United States Patent
Nakayama

(10) Patent No.: US 10,192,153 B2
(45) Date of Patent: Jan. 29, 2019

(54) APPARATUS AND CONTROL METHOD THEREOF

(71) Applicant: CANON KABUSHIKI KAISHA, Tokyo (JP)

(72) Inventor: Shiro Nakayama, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/497,679

(22) Filed: Apr. 26, 2017

(65) Prior Publication Data

US 2017/0228625 A1 Aug. 10, 2017

Related U.S. Application Data

(63) Continuation of application No. 13/768,351, filed on Feb. 15, 2013, now Pat. No. 9,665,809.

(30) Foreign Application Priority Data

Mar. 5, 2012 (JP) ................................. 2012-048614

(51) Int. Cl.
*G06K 15/00* (2006.01)
*B41J 2/01* (2006.01)
*G06K 15/10* (2006.01)

(52) U.S. Cl.
CPC ............ *G06K 15/4075* (2013.01); *B41J 2/01* (2013.01); *G06K 15/102* (2013.01); *G06K 15/402* (2013.01); *G06K 15/4045* (2013.01)

(58) Field of Classification Search
CPC ............ G06K 15/4075; G06K 15/102; G06K 15/402; G06K 15/4045; B41J 2/01
See application file for complete search history.

(56) References Cited

U.S. PATENT DOCUMENTS

| 7,128,408 | B2 | 10/2006 | Kosugi |
| 2003/0160839 | A1 | 8/2003 | Kosugi |
| 2005/0078337 | A1 | 4/2005 | Ichikawa et al. |
| 2005/0280511 | A1 | 12/2005 | Yokoyama |
| 2006/0132514 | A1* | 6/2006 | Honda ................. G03G 15/105 347/7 |
| 2006/0161658 | A1 | 7/2006 | Noguchi |
| 2009/0248791 | A1 | 10/2009 | Shiraki |

(Continued)

FOREIGN PATENT DOCUMENTS

| CN | 1113329 | 12/1995 |
| CN | 1497411 | 5/2004 |

(Continued)

OTHER PUBLICATIONS

Chinese Office Action dated Apr. 3, 2018 in Chinese Application No. 201610969215.3.

(Continued)

*Primary Examiner* — Iriana Cruz
(74) *Attorney, Agent, or Firm* — Venable, LLP

(57) ABSTRACT

An apparatus including a communication unit configured to communicate with a communication device and be able to output data stored in a memory to the communication device even without power supplied from a power supply to the apparatus stores, in the memory, status information to specify the status of the apparatus in a state in which the power supply supplies the power to the apparatus.

27 Claims, 19 Drawing Sheets

(56) References Cited

U.S. PATENT DOCUMENTS

| | | | |
|---|---|---|---|
| 2010/0225970 A1 | 9/2010 | Iwashima | |
| 2010/0231958 A1 | 9/2010 | Okigami | |
| 2011/0292445 A1* | 12/2011 | Kato | G06F 3/1222 358/1.15 |
| 2011/0310198 A1 | 12/2011 | Honoki | |
| 2013/0079026 A1* | 3/2013 | Hagedorn | H04W 4/027 455/456.1 |
| 2018/0276511 A1* | 9/2018 | Sato | G06K 15/007 |

FOREIGN PATENT DOCUMENTS

| | | |
|---|---|---|
| CN | 101674109 | 3/2010 |
| CN | 101827184 | 9/2010 |
| CN | 101834656 A | 9/2010 |
| JP | 2001-218176 A | 8/2001 |
| JP | 2002-234192 | 8/2002 |
| JP | 2005-067195 A | 3/2005 |
| JP | 2006-5633 | 1/2006 |
| JP | 2006-041759 A | 2/2006 |
| JP | 2006-231775 | 9/2006 |
| JP | 2009-184225 | 8/2009 |
| JP | 2010-006016 | 1/2010 |
| JP | 2012-000892 | 1/2012 |

OTHER PUBLICATIONS

Chinese Office Action dated Feb. 25, 2015 during prosecution of related Chinese application No. 201310069389.0. (Whole English-language translation included) (Cited during prosecution of parent U.S. Appl. No. 13/768,351.

Japanese Office Action dated Jan. 12, 2016 during prosecution of related Japanese application No. 2012-048614. (Cited during prosecution of parent U.S. Appl. No. 13/768,351).

* cited by examiner

APPARATUS AND CONTROL METHOD THEREOF

This application is a continuation of application Ser. No. 13/768,351, filed Feb. 15, 2013, which claims priority to Japanese Application No. JP 2012-048614, filed Mar. 5, 2012, the contents of each of which are incorporated by reference herein.

BACKGROUND OF THE INVENTION

Field of the Invention

The present invention relates to an apparatus which are capable of communication, and a control method thereof.

Description of the Related Art

A print apparatus such as an inkjet printer generally includes a mechanism such as an ink tank that holds ink to be used for printing. In this case, the print apparatus monitors the ink remaining amount or used amount to, for example, prevent the ink from running out during printing, as in Japanese Patent Laid-Open No. 2012-000892 (to be referred to as literature 1 hereinafter). Especially a mechanism using a detachable ink tank interchangeable by the user needs to notify the user of the ink remaining amount or used amount and prompt him/her to exchange the ink tank in some cases. For this purpose, the print apparatus records a device status such as an ink remaining amount in its internal memory. There is also proposed a system that more accurately manages the ink remaining amount or the like by writing it in a non-volatile memory provided in the ink tank, as in Japanese Patent Laid-Open No. 2002-234192 (to be referred to as literature 2 hereinafter).

On the other hand, Japanese Patent Laid-Open No. 2010-006016 (to be referred to as literature 3 hereinafter) proposes a system that provides a short distance wireless communication unit in a print apparatus, obtains print data from an external apparatus, and notifies the external apparatus of an error.

The device status of the print apparatus is recorded on the internal memory of the apparatus in literatures 1 and 3 or on the memory of the detachable mechanism in literature 2. For this reason, to obtain the device status, the print apparatus needs to be activated, and the user needs to wait for activation of the print apparatus. Particularly in a print apparatus constituted as an inkjet printer, preparation for printing such as preliminary discharge is performed at times even if printing is not performed. Hence, unnecessary ink is consumed in addition to the time to wait for startup of the print apparatus.

That is, generally, to confirm the state of an apparatus, activating the apparatus is indispensable. To activate the apparatus, a specific time is needed. In addition, consumable items may be consumed, as in an inkjet printer. Hence, a general information processing system cannot meet requirements to operate an apparatus after status confirmation or select an apparatus to be activated from a plurality of apparatuses after status confirmation.

SUMMARY OF THE INVENTION

According to one embodiment of the present invention, there are provided an information processing system and an information processing apparatus, which allow to obtain device information even in a state in which the power supply system of an information processing apparatus does not supply power, and a control method thereof.

According to one aspect of the present invention, there is provide an apparatus comprising: a communication unit configured to communicate with a communication device and be able to output data stored in a memory to the communication device even without power supplied from a power supply to the apparatus; and a storage unit configured to store, in the memory, status information to specify a status of the apparatus in a state in which the power supply supplies the power to the apparatus.

Also, according to another aspect of the present invention, there is provided a control method of an apparatus including a communication unit configured to communicate with a communication device and be able to output data stored in a memory to the communication device even without power supplied from a power supply to the apparatus, the method comprising: a storage step of storing, in the memory, status information to specify a status of the apparatus in a state in which the power supply supplies the power to the apparatus.

Further features of the present invention will become apparent from the following description of exemplary embodiments with reference to the attached drawings.

DESCRIPTION OF THE EMBODIMENTS

A preferred embodiment of the present invention will now be described exemplarily in detail with reference to the accompanying drawings. However, the scope of the present invention is not limited to the relative arrangements of the constituent elements, display screens, and the like described in the embodiment unless otherwise specified.

In this embodiment, an example will be described in which information about the device status of an MFP (MultiFunction Peripheral) (especially, the device status of a print apparatus) is transmitted using a short distance wireless communication method. More specifically, a method of transmitting/receiving data using short distance wireless communication such as NFC (Near Field Communication) even in, for example, a hard-off state in which the MFP is not in an active state will be explained. Note that in this embodiment, as an information processing system in which a first information processing apparatus and a second information processing apparatus can be connected by such short distance wireless communication, an example in which an MFP is used as the first information processing apparatus, and a portable communication terminal is used as the second information processing apparatus will be described.

Figure 1:
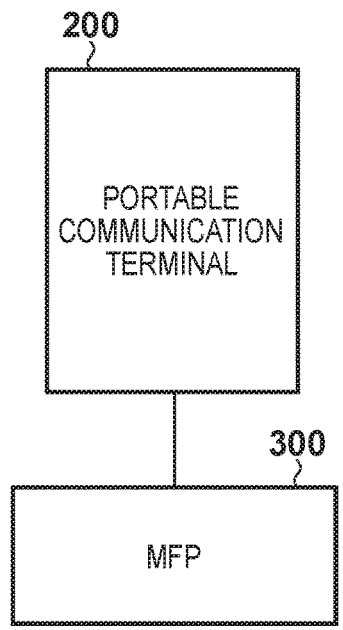
FIG. 1 is a block diagram showing an example of the arrangement of a wireless communication system according to the embodiment.

FIG. 1 is a view showing an example of the arrangement of a wireless communication system according to this embodiment. A portable communication terminal 200 and an MFP 300 can be connected to communicate with each other by NFC and the like. The portable communication terminal 200 can be any portable information processing apparatus, for example, a personal information terminal such as a PDA (Personal Digital Assistant), a mobile phone, or a digital camera. The MFP 300 has a reading function of reading a document placed on a platen glass, and a printing function using a printing unit such as an inkjet printer. The MFP 300 may also have a FAX function and a telephone function as other functions. In this embodiment, the MFP 300 is exemplified as an information processing apparatus capable of communicating with the portable communication terminal by NFC. However, the present invention is not limited to this. For example, a monofunctional printer may be used.

Figure 2:
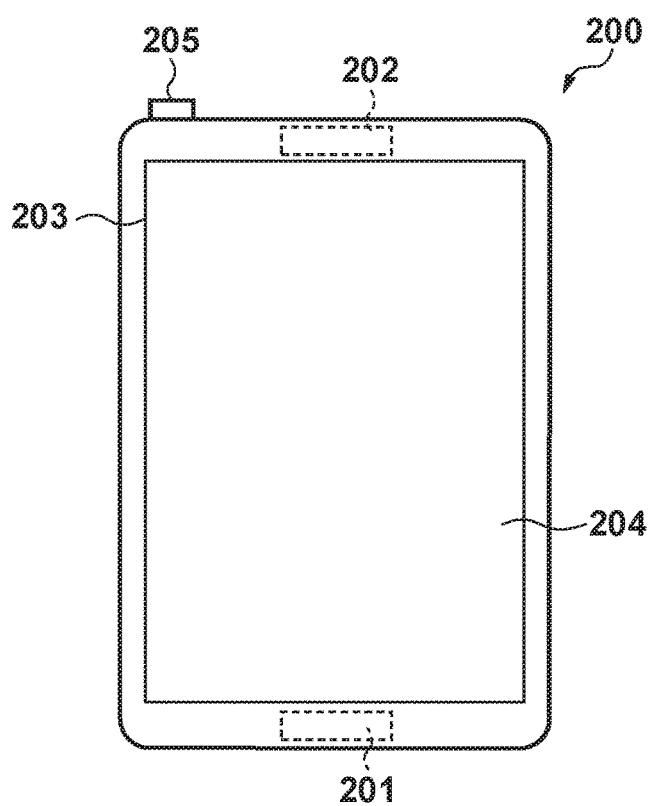
FIG. 2 is a view showing the outer appearance of a portable communication terminal 200.

FIG. 2 is a view showing the outer appearance of the portable communication terminal 200. In this embodiment, a smartphone will be exemplified. The smartphone is a multifunctional mobile phone including a camera, a network browser, a mail function, and the like as well as the functions of a mobile phone. An NFC unit 201 is a unit that performs communication using NFC. Communication can be performed by actually moving the NFC unit 201 close to within about 10 cm of a partner NFC unit. A wireless LAN (referred to as WLAN hereinafter) unit 202 is a unit used to communicate with another device by WLAN. The NFC unit 201 and the WLAN unit 202 are arranged in the portable communication terminal 200. A display unit 203 is a display having an LCD display mechanism. An operation unit 204 includes a touch-panel operation mechanism and detects touch information of the user. As a representative operation method, the display unit 203 displays button-shaped images, and when the user touches the operation unit 204, an event of touch on a button is issued. A power supply key 205 is used to power on/off the portable communication terminal 200.

Figure 3A:
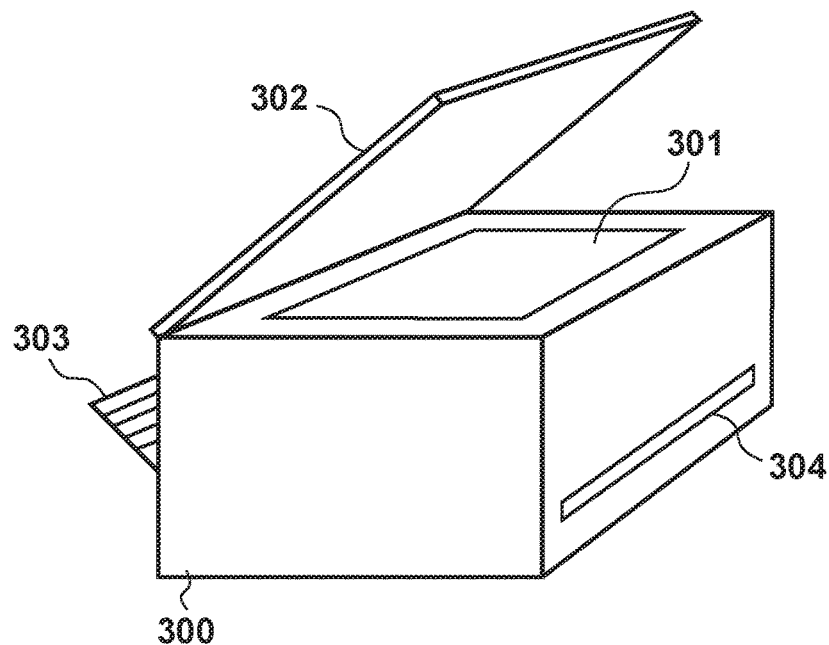
FIGS. 3A and 3B are views showing the outer appearance of an MFP (MultiFunction Peripheral) according to the embodiment.
Figure 3B:
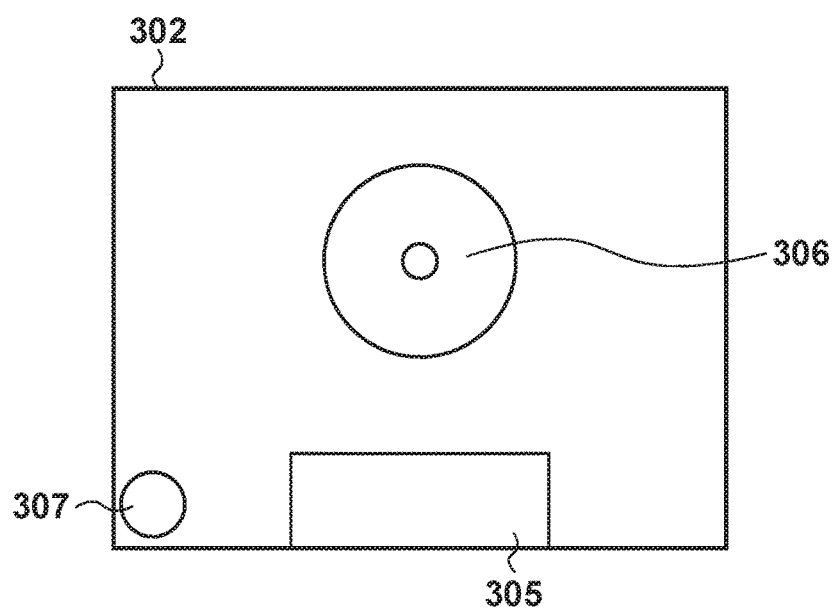

FIG. 3A is a view showing the outer appearance of the MFP 300, and FIG. 3B is a view showing the outer appearance of the MFP 300 viewed from the upper side. A platen glass 301 is a transparent glass table and is used to place a document to be read by a scanner. A document cover 302 is used to prevent reading light from externally leaking at the time of reading by the scanner. A printing paper insert port 303 is used to set paper sheets of various sizes. The paper sheets set in the printing paper insert port 303 are conveyed to the printing unit one by one, undergo desired printing, and are discharged from a printing paper discharge port 304. As shown in FIG. 3B, an operation display unit 305 and an NFC unit 306 are arranged on the document cover 302. The operation display unit 305 includes various kinds of input switchers and indicators for user operations. The user can do various settings of the MFP 300 and confirm device information such as the device status and the set status via the operation display unit 305. The NFC unit 306 is a unit used to perform short distance wireless communication and a portion to which the NFC unit of another device is actually moved close. The effective range of short distance wireless communication is about 10 cm from the NFC unit 306. A WLAN antenna 307 is used to perform communication by WLAN and is embedded in the MFP 300.

NFC communication will be explained here. When short distance communication using the NFC unit is performed, an apparatus that starts the communication first by outputting an RF (Radio Frequency) field is called an initiator. An apparatus that communicates with the initiator by responding to a command issued by the initiator is called a target. The NFC unit has a passive mode and an active mode as the communication modes. In the passive mode, the target responds to the command of the initiator by performing load modulation for the command of the initiator. On the other hand, in the active mode, the target responds to the command of the initiator using an RF field generated by the target itself. Note that in the passive mode, the NFC unit can transmit/receive data to/from another NFC unit even without power supplied from a power supply such as an AC power supply or a battery, as will be described later.

Figure 4A:
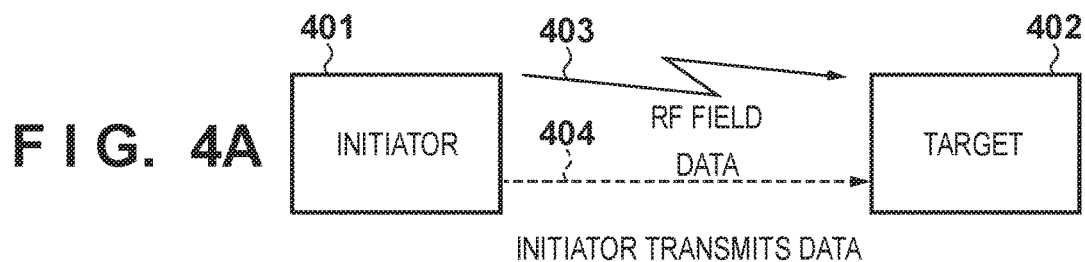
FIGS. 4A and 4B are conceptual views of a passive mode in NFC communication.
Figure 4B:
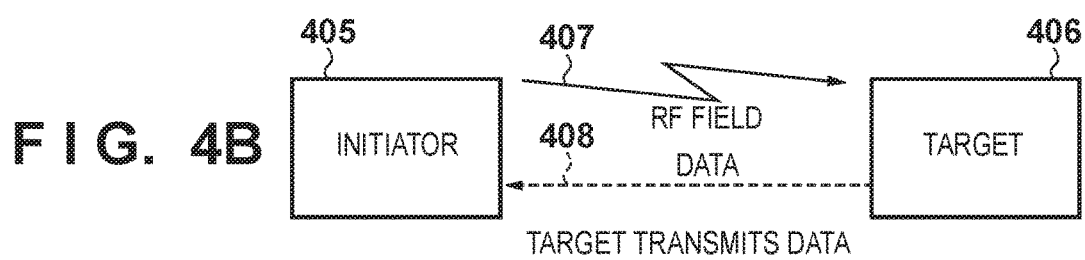

FIGS. 4A and 4B are conceptual views of the passive mode in NFC communication. As shown in FIG. 4A, when an initiator 401 is to transmit data 404 to a target 402 in the passive mode, the initiator 401 generates an RF field 403 and establishes communication. The initiator 401 modulates the RF field 403 by itself, thereby transmitting the data 404 to the target 402. As shown in FIG. 4B, when a target 406 is to transfer data 408 to an initiator 405 in the passive mode, the initiator 405 generates an RF field 407, as in FIG. 4A. The target 406 performs load modulation for the RF field 407 supplied from the initiator 405, thereby transmitting the data 408 to the initiator 405.

Figure 5A:
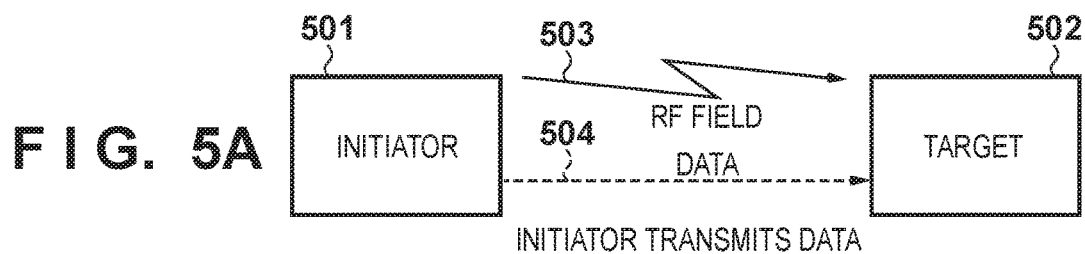
FIGS. 5A and 5B are conceptual views of an active mode in NFC communication.
Figure 5B:
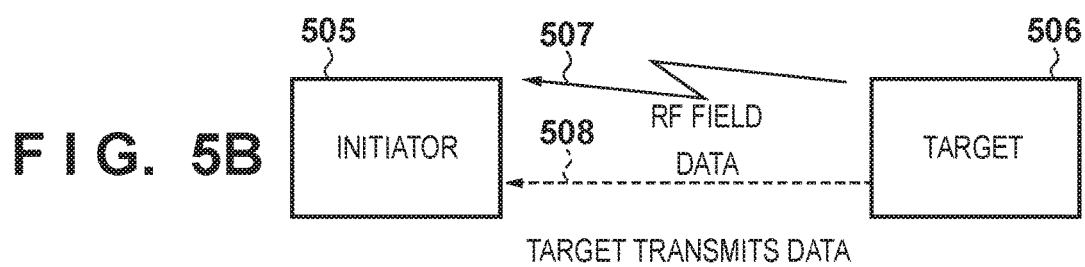

FIGS. 5A and 5B are conceptual views of the active mode in NFC communication. As shown in FIG. 5A, when an initiator 501 is to transmit data 504 to a target 502 in the active mode, the initiator 501 generates an RF field 503 and establishes communication. The initiator 501 modulates the RF field 503 by itself, thereby transmitting the data 504 to the target 502. When data transmission is completed, the initiator 501 stops outputting the RF field 503. As shown in FIG. 5B, when a target 506 is to transmit data 508 to an initiator 505 in the active mode, the target 506 generates an RF field 507. The target 506 transmits the data 508 by the RF field 507 generated by itself and stops outputting the RF field 507 upon completing transmission.

Figure 6:
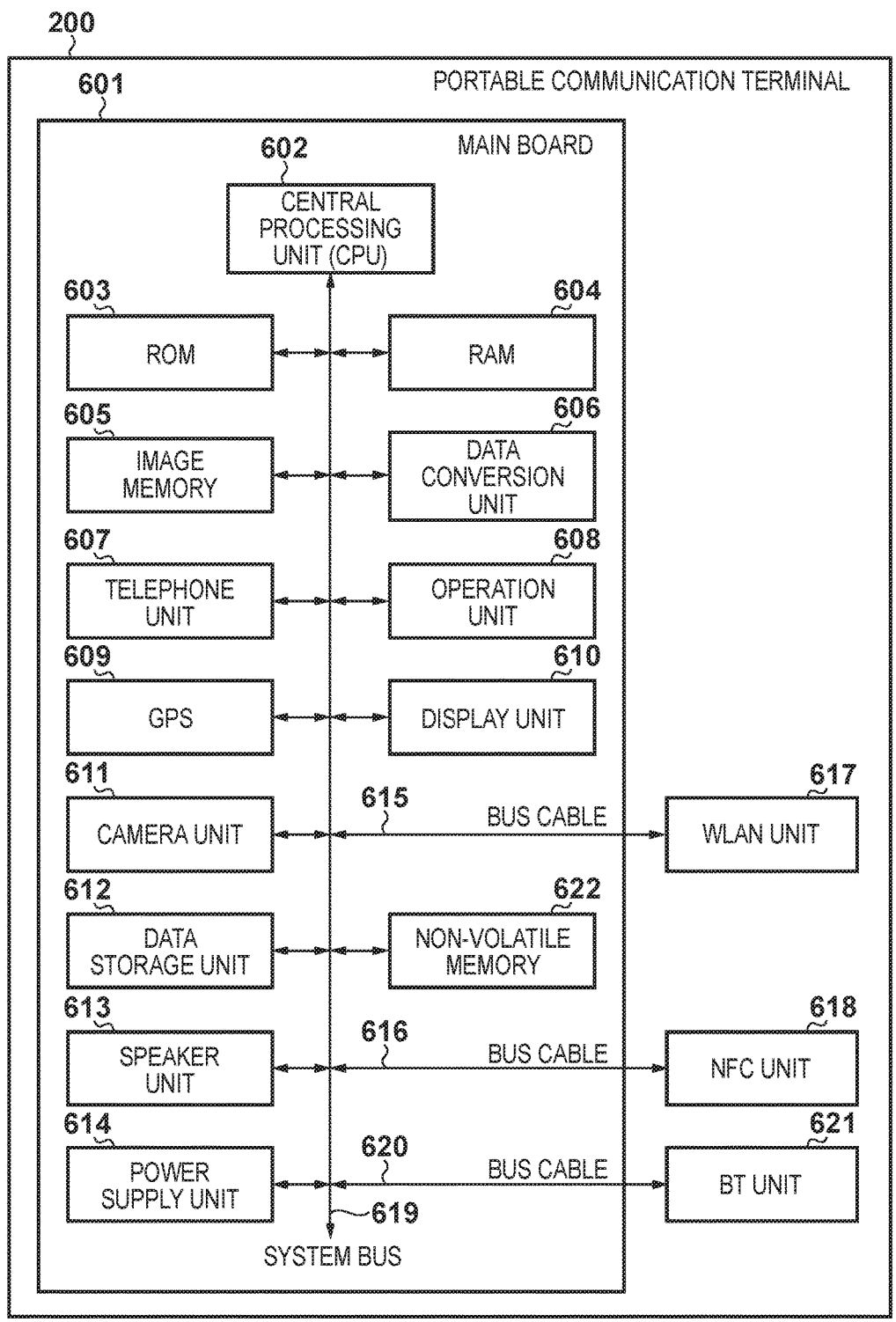
FIG. 6 is a block diagram showing an example of the arrangement of the portable communication terminal according to the embodiment.

FIG. 6 is a block diagram of the portable communication terminal 200. The portable communication terminal 200 includes a main board 601 that performs main control of the apparatus, a WLAN unit 617 that performs WLAN communication, an NFC unit 618 that performs NFC communication, and a BT unit 621 that performs Bluetooth® communication.

In the main board 601, a CPU 602 is a system control unit and controls the entire portable communication terminal 200. A ROM 603 stores control programs, an embedded operating system (OS) program, and the like to be executed by the CPU 602. In this embodiment, each control program stored in the ROM 603 performs software control such as scheduling and task switching under the management of the embedded OS stored in the ROM 603.

A RAM 604 is formed from an SRAM (static RAM) or the like. The RAM 604 stores program control variables, stores set values registered by the user, management data of the portable communication terminal 200, and the like, and also includes various kinds of work buffer areas.

An image memory 605 is formed from a DRAM (dynamic RAM) or the like. The image memory 605 temporarily stores image data received via each communication unit or image data read out from a data storage unit 612 for processing by the CPU 602. A non-volatile memory 622 is formed from a flash memory or the like and stores data to be saved even after power-off. Example of such data are telephone directory data and information of devices connected in the past. Note that the memory structure is not limited to the above-described structure. For example, the image memory 605 and the RAM 604 may share a memory, or data may be backed up in the data storage unit 612. In this embodiment, a DRAM is used as the image memory 605. However, the present invention is not limited to this, and a hard disk, a non-volatile memory, or the like may be used.

A data conversion unit 606 performs analysis of a data description language (PDL) or data conversion such as color conversion and image conversion. A telephone unit 607 controls a telephone line and processes voice data input/output via a speaker unit 613 to implement communication by telephone. An operation unit 608 controls the signal of the operation unit 204 described with reference to FIG. 2. A GPS (Global Positioning System) 609 obtains the current latitude and longitude. A display unit 610 electronically controls the display contents of the display unit 203 described with reference to FIG. 2 and can display various kind of input operations, the operation state and status of the MFP 300, and the like.

A camera unit 611 has a function of electronically recording and coding an image input via a lens. The image captured by the camera unit 611 is saved in a data storage unit 612. The speaker unit 613 implements a function of inputting or outputting a voice for the telephone function, an alarm notification function, and the like. A power supply unit 614 is a portable battery and controls it. The power supply states of the portable communication terminal 200 include a battery dead state corresponding to a zero battery level, a power off state before the power supply key 205 is pressed, an active state in which the apparatus is normally activated, and a power saving state in which the apparatus is activated, but the power is saved.

The portable communication terminal 200 includes three types of components as communication units used to perform wireless communication with another device such as an MFP. The portable communication terminal 200 can perform wireless communication by WLAN, NFC, and Bluetooth®. To implement these wireless communications, the WLAN unit 617, the NFC unit 618, and the BT unit 621 are connected to a system bus 619 via bus cables 615, 616, and 620, respectively. The WLAN unit 617, the NFC unit 618, and the BT unit 621 are units configured to implement communication complying with the corresponding standards. Each of the communication units converts data into packets by a corresponding communication method and transmits the packets to another external device. In addition, each unit converts packets from another external device into data and transmits the data to the CPU 602. Details of the NFC unit will be described later with reference to FIG. 8. The above-described constituent elements are connected to each other via the system bus 619 managed by the CPU 602.

Figure 7:
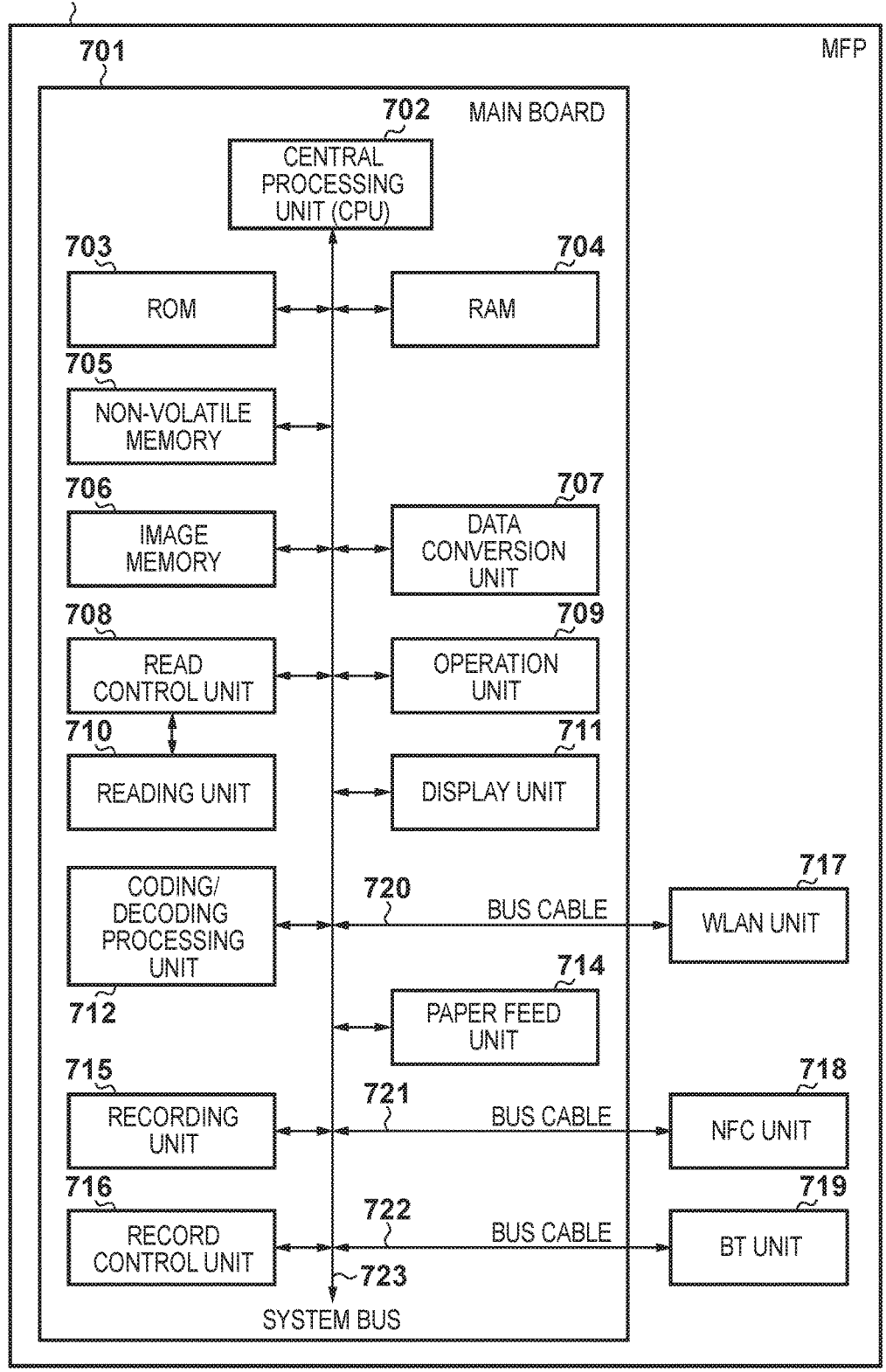
FIG. 7 is a block diagram showing an example of the arrangement of the MFP according to the embodiment.

FIG. 7 is a block diagram showing the schematic arrangement of the MFP 300. The MFP 300 includes a main board 701 that performs main control of the apparatus, a WLAN unit 717 that performs WLAN communication, an NFC unit 718 that performs NFC communication, and a BT unit 719 that performs Bluetooth® communication.

In the main board 701, a CPU 702 is a system control unit and controls the entire MFP 300. A ROM 703 stores control programs, an embedded operating system (OS) program, and the like to be executed by the CPU 702. In this embodiment, each control program stored in the ROM 703 performs software control such as scheduling and task switching under the management of the embedded OS stored in the ROM 703.

A RAM 704 is formed from an SRAM (static RAM) or the like. The RAM 704 includes various kinds of work buffer areas to store program control variables, set values registered by the user, management data of the MFP 300, and the like. A non-volatile memory 705 is formed from a flash memory or the like and stores data to be held even after power-off. Detailed examples of the data are network connection information and user data. An image memory 706 is formed from a DRAM (dynamic RAM) or the like. The image memory 706 stores image data received via each communication unit, image data processed by a coding/decoding processing unit 712, image data obtained via a memory card controller (not shown), and the like. Like the memory structure of the portable communication terminal 200, the memory structure of the MFP 300 is not limited to the above-described structure. A data conversion unit 707 performs analysis of a data description language (PDL) or conversion of image data into print data.

A read control unit 708 and a reading unit 710 will be described next. The reading unit 710 optically reads a document by a CIS image sensor (contact type image sensor) under the control of the read control unit 708. The read control unit 708 converts the signal obtained by causing the reading unit 710 to read the document into electrical image data, thereby generating an image signal. In addition, the read control unit 708 performs, for the generated image signal, various kinds of image processing such as binarization processing and halftone processing via an image processing control unit (not shown) and outputs high-resolution image data.

An operation unit 709 and a display unit 711 represent the operation display unit 305 described with reference to FIGS. 3A and 3B. The coding/decoding processing unit 712 performs coding/decoding processing or enlargement/reduction processing for the image data (JPEG, PNG, or the like) handled by the MFP 300.

A paper feed unit 714 is a portion capable of holding paper sheets for printing. The paper feed unit 714 can feed paper under the control of a record control unit 716. Especially, a plurality of paper feed units 714 can be prepared to hold a plurality of kinds of paper sheets in one apparatus. The record control unit 716 can control which paper feed unit feeds paper.

The record control unit 716 converts the image data to be printed into high-resolution image data by performing various kinds of image processing such as smoothing processing, recording density correction processing, and color correction via the image processing control unit (not shown) and outputs the image data to a recording unit 715. The record control unit 716 also has a function of periodically reading out the information of the recording unit 715 and updating the information in the RAM 704. More specifically, the ink amount remaining in the ink tank, the state of the printhead, and the like are updated.

The MFP 300 also includes three types of components (the WLAN unit 717, the NFC unit 718, and the BT unit 719) used for wireless communication. Their functions are the same as those in the portable communication terminal 200, and a description thereof will be omitted. The above-described constituent elements are connected to each other via a system bus 723 managed by the CPU 702. The WLAN unit 717, the NFC unit 718, and the BT unit 719 are also connected to the system bus 723 via bus cables 720, 721, and 722, respectively.

Figure 8:
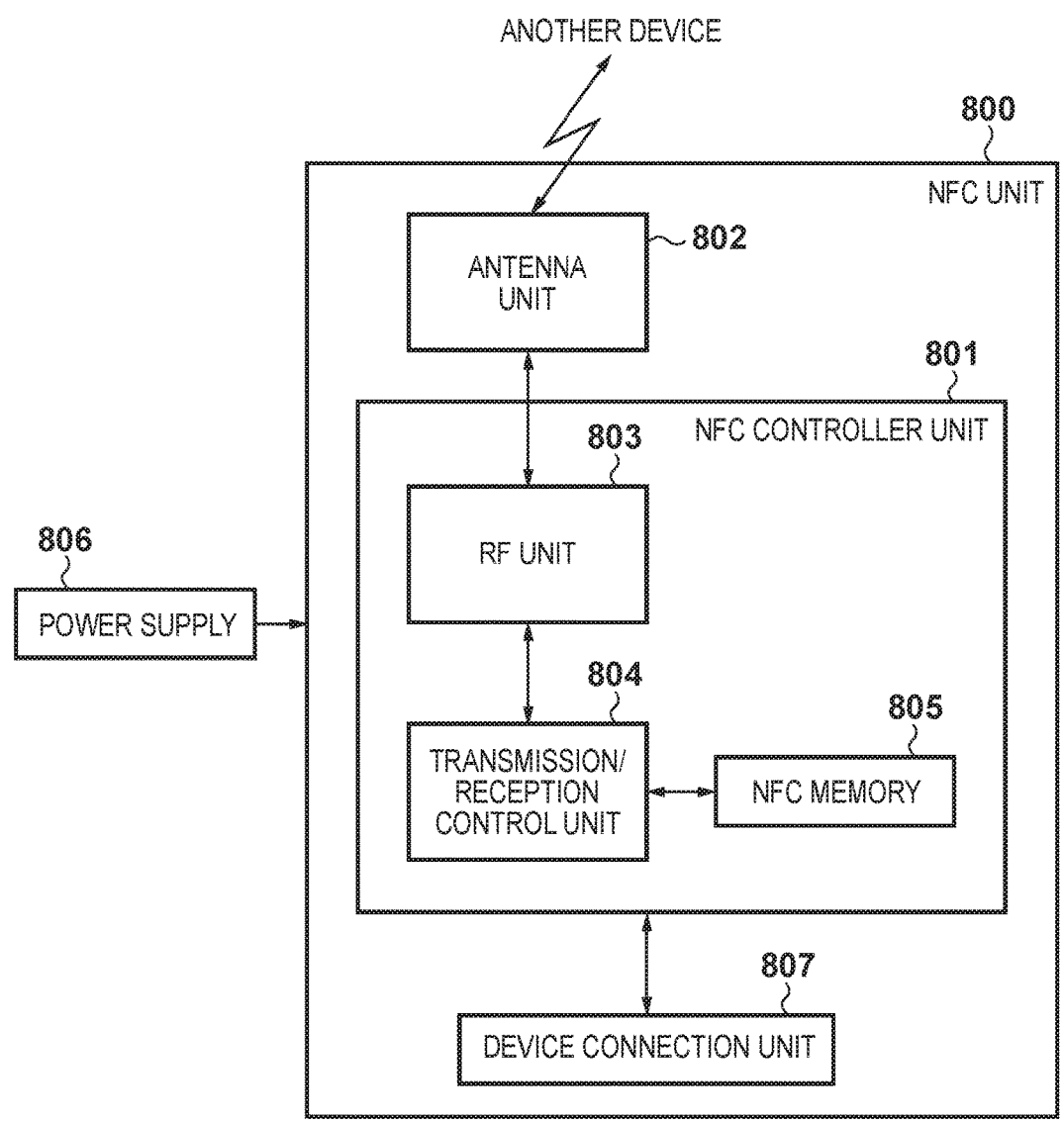
FIG. 8 is a block diagram showing a detailed example of the arrangement of an NFC unit.

FIG. 8 is a block diagram showing details of an NFC unit 800 used as the NFC unit 618 of the portable communication terminal 200 or the NFC unit 718 of the MFP 300. The arrangement of the NFC unit 800 will be described below with reference to FIG. 8. The NFC unit 800 includes an NFC controller unit 801, an antenna unit 802, an RF unit 803, a transmission/reception control unit 804, an NFC memory 805, and a device connection unit 807. An external power supply 806 supplies power to the NFC unit 800. The antenna unit 802 receives a radio wave, an electromagnetic wave such as a magnetic field, or a carrier from another NFC device or transmits a radio wave, an electromagnetic wave such as a magnetic field, or a carrier to another NFC device. The RF unit 803 has a function of modulating/demodulating an analog signal into a digital signal. The RF unit 803 includes a synthesizer, identifies the frequency of a band or a channel, and controls the band or channel by frequency assignment data. The transmission/reception control unit 804 performs control concerning transmission/reception, including frame segmentation and reassembly, preamble addition and detection, and frame identification. The transmission/reception control unit 804 also controls the NFC memory 805 and reads/writes various kinds of data and programs. When operating in the active mode, the NFC unit 800 operates by receiving power via the power supply 806. The NFC unit 800 communicates with a device via the device connection unit 807 or communicates with another NFC device within a communication range using carriers transmitted/received via the antenna unit 802. When operating in the passive mode, the NFC unit 800 receives power supplied by electromagnetic induction using a carrier (RF field) received from another NFC unit via the antenna unit 802. The NFC unit 800 thus receives power supplied from another NFC unit, communicates with the other NFC unit by modulating the carrier, thereby transmitting/receiving data. This allows the NFC unit 800 to transmit/receive data to/from another NFC unit even without power supplied from the power supply 806 in the passive mode.

Figure 9:
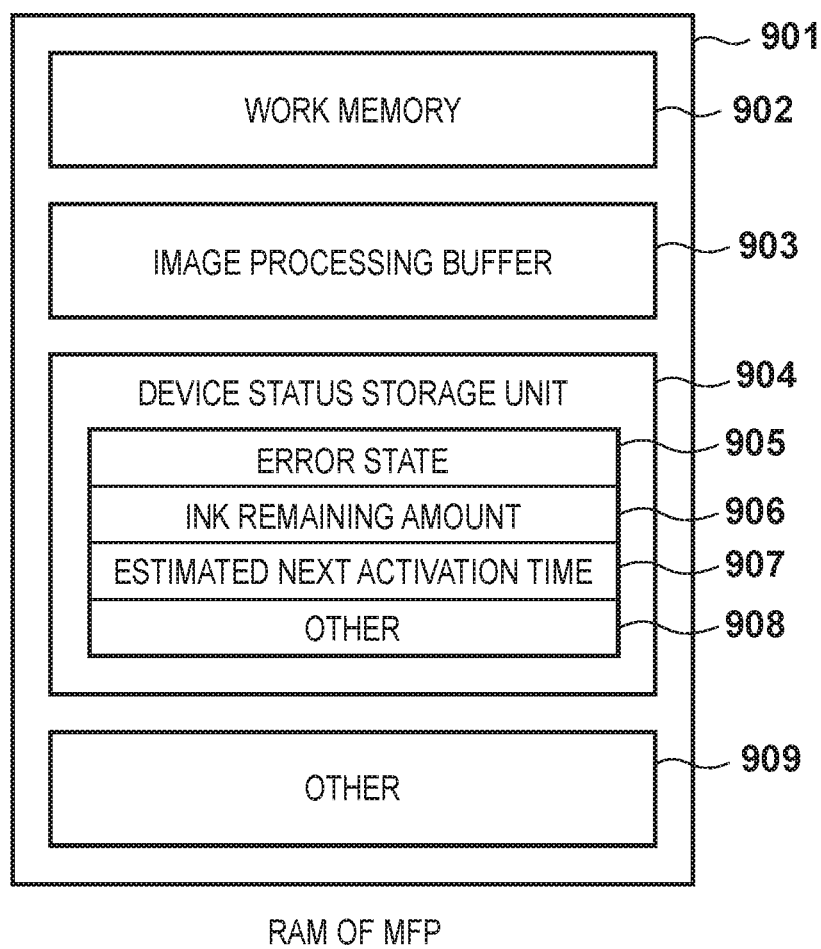
FIG. 9 is a view showing an example of the data structure of the RAM of the MFP.

FIG. 9 is a view showing the arrangement of the RAM 704 of the MFP 300. Reference numeral 901 denotes an entire RAM 704. A work memory 902 is a memory allocated to execute a program. An image processing buffer 903 is an area used as a temporary buffer for image processing. A device status storage unit 904 stores various kinds of information about the current state of the MFP 300. An error state 905 is a state about an error of the MFP 300 and includes, for example, a low-ink warning, an ink-out error, a paper jam error, a paper-out warning, an image printing failure warning, an image reading failure warning, and a network disconnection warning. The level of influence on the printing function, the level of influence on the reading function, and the like are associated with these warnings and errors. For example, in case of the ink-out error, the printing function is unusable, but the reading function is usable. In case of the network disconnection warning, any function using the network is unusable, but a setting change in the device alone or the reading function is usable. An ink remaining amount 906 stores the model number of the ink tank currently attached to the MFP 300 and the ink remaining amount. The model number of the ink tank is updated at the timing of attaching the ink tank. The ink remaining amount 906 is updated every time the ink is used. An estimated next activation time 907 is the estimated time of next activation at the time of power-off. The activation time of the MFP 300 largely changes depending not the state. The power supply states of the MFP 300 include, for example, a hard-off state, a soft-off state, a normal activation state, and a sleep state. The hard-off state is a state in which the power supply has stopped. To cause transition from the hard-off state to the normal activation state by power-on, a long time is required. The soft-off state is a state in which the power supply is partially supplied so that some of the plurality of functions of the MFP 300 are active, though the main program is not activated. In this case, the MFP can be activated in a shorter time than hard-off. In the sleep state, some of the plurality of functions are active, but parts that consume large power are off, and other programs and mechanisms are operating. Hence, the normal activation state can be restored immediately. Another factor that causes a variation in the activation time is an error state of the device. For example, upon detecting that many of the nozzles of the inkjet printhead are clogged, the MFP is activated next time after long-time recovery processing. If the light power of the scanner has dropped, the MFP is activated after an adjustment operation. In this way, the estimated activation time of the next activation is decided based on the power supply state transition and the device status. Other 908 includes other device statuses such as the current memory utilization, hardware temperature, and consumable information. Other 909 stores other RAM data.

Figure 10:
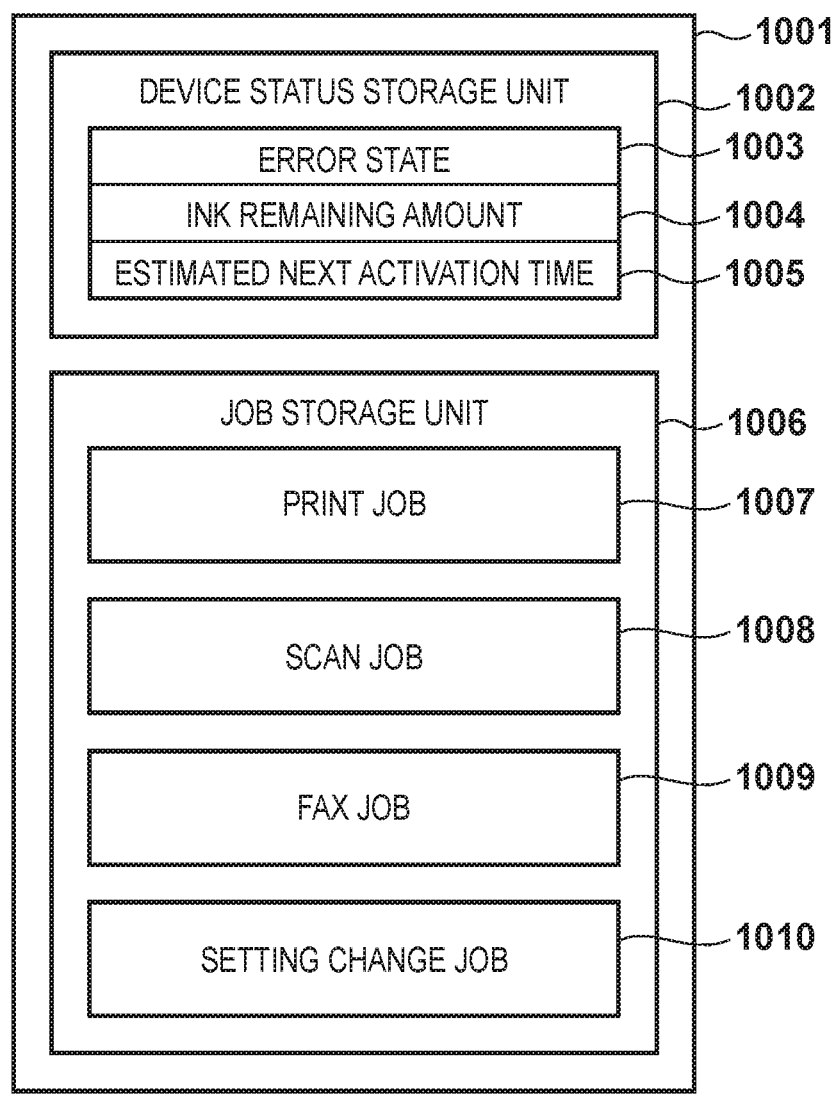
FIG. 10 is a view showing the data structure of the NFC memory of the MFP.

FIG. 10 shows the arrangement of the NFC memory 805 of the MFP 300. Reference numeral 1001 denotes the entire NFC memory 805. The CPU 702 copies all or some of the contents of the device status storage unit 904 to a device status storage unit 1002 at a predetermined timing. That is, the error state 905, the ink remaining amount 906, and the estimated next activation time 907 recorded in the RAM 704 are recorded in the NFC memory 805 as an error state 1003, an ink remaining amount 1004, and an estimated next activation time 1005. Note that although the other 908 is not copied in FIG. 10, the present invention is not limited to this. For example, all pieces of information of the other 908 may be copied to the NFC memory 805. Alternatively, arbitrary data such as job storage recorded as the other 908 may be selected and stored in the NFC memory 805. A job storage unit 1006 is an area used to submit a job from the portable communication terminal 200 to the MFP 300 by NFC. A print job 1007 stores print jobs in queue. More specifically, print settings and an image link destination are stored. A scan job 1008 stores scan jobs in queue. More specifically, reading settings are stored. A FAX job 1009 stores FAX jobs in queue. More specifically, FAX settings including the telephone number of a transmission destination and communication quality, and if an image has already been read, the link destination of the image are stored. A setting change job 1010 stores setting change jobs in queue. More specifically, jobs concerning changes in the setting items of the main body are stored.

Figure 11:
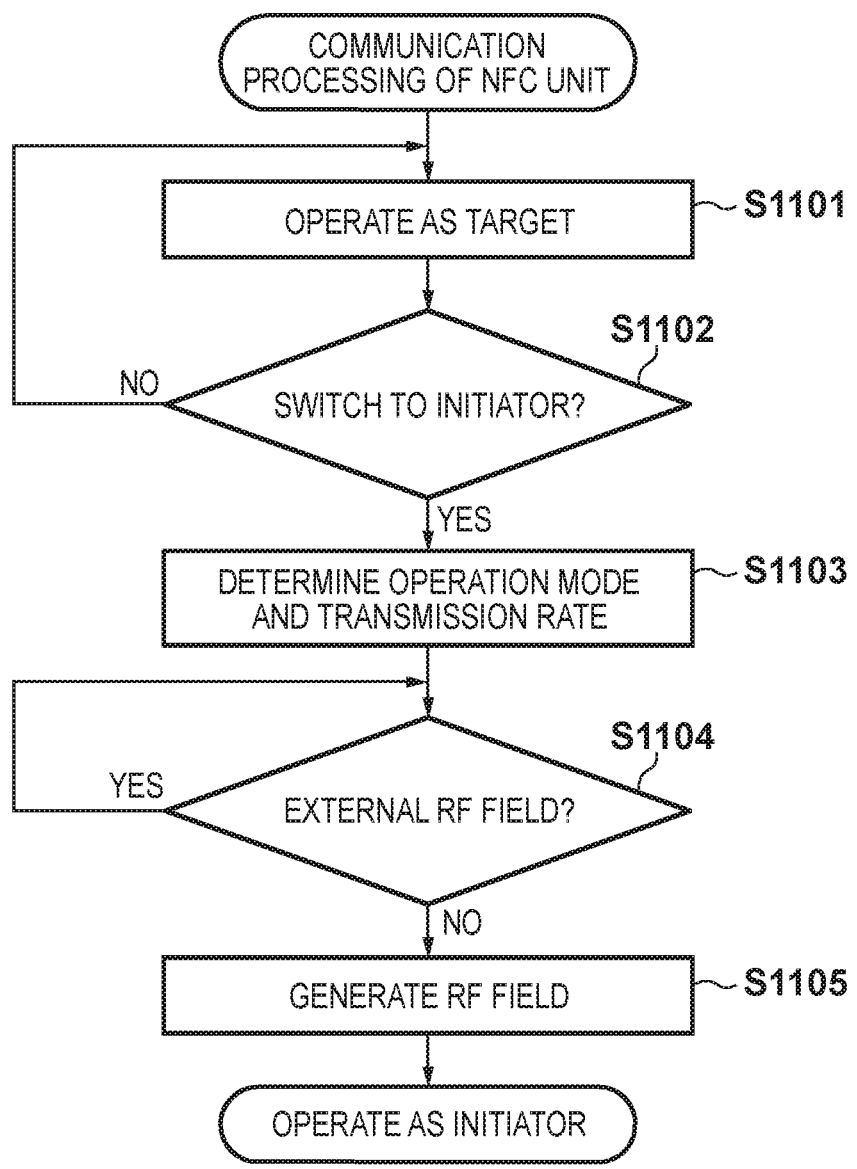
FIG. 11 is a flowchart showing the operation of the NFC unit serving as an initiator.

FIG. 11 is a flowchart for causing the NFC unit 800 to operate as an initiator. First, in step S1101, every NFC unit operates as a target and waits for a command from an initiator. In step S1102, the NFC controller unit 801 determines whether an application for controlling communication complying with the NFC standards has requested to switch to an initiator. If the NFC unit 800 has responded to the request to switch to the initiator, the application selects one of the active mode and the passive mode and decides the transmission rate in step S1103. In step S1104, the initiator detects the existence of an RF field output from an apparatus other than itself. If an external RF field exists, the initiator does not generate the RF field of its own, and therefore waits until detection of the RF field output from the apparatus other than the local apparatus ends. If no external RF field exists, the process advances to step S1105, and the NFC controller unit 801 generates an RF field via the antenna unit 802. With the above-described steps, the NFC unit 800 starts the operation as the initiator.

Figure 12:
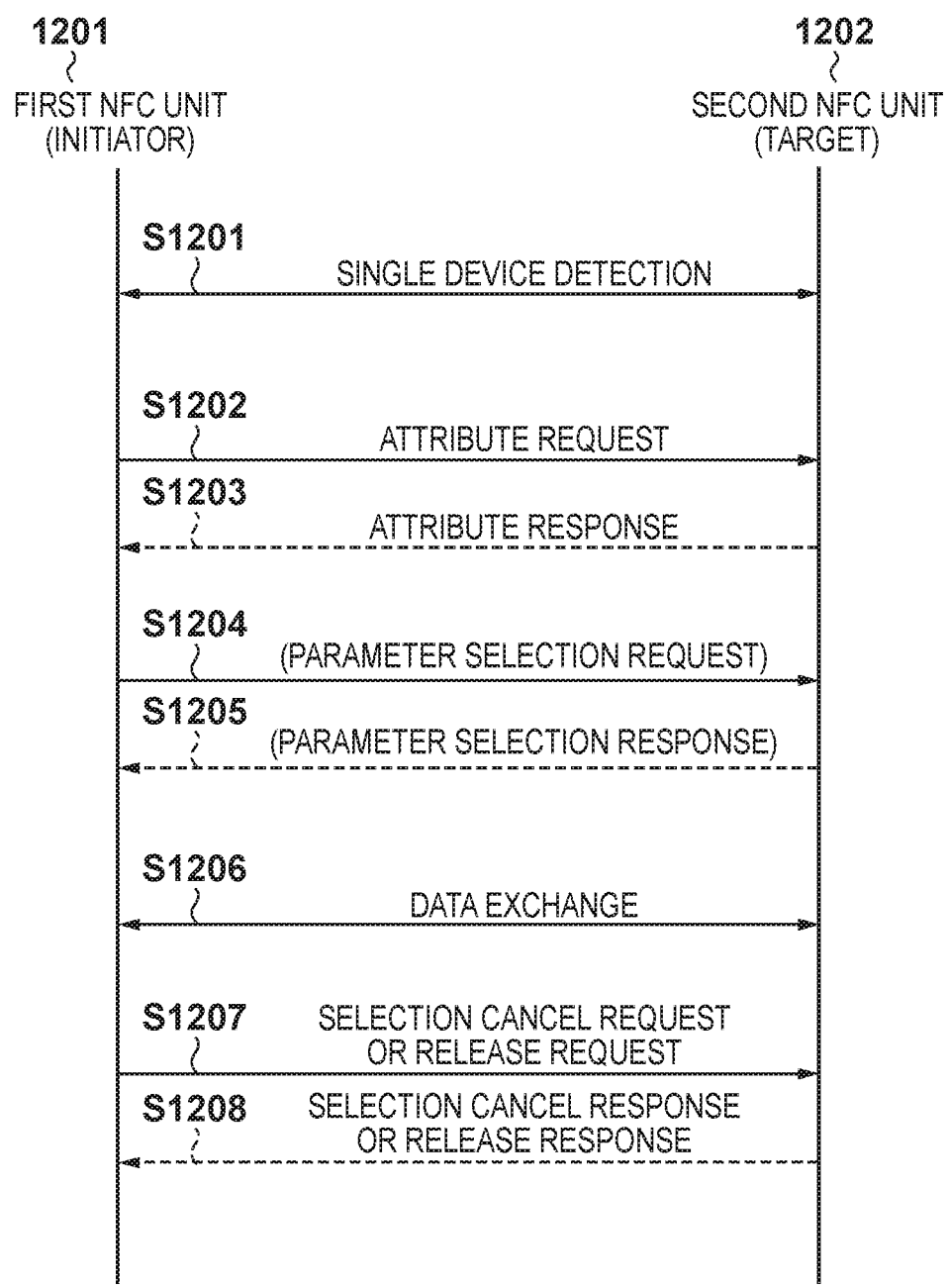
FIG. 12 is a sequence chart showing the sequence of performing data exchange in the passive mode.

FIG. 12 shows the sequence including communication establishment, data exchange, and target release in the passive mode. A case will be described below in which a first NFC unit 1201 operates as the initiator, and a second NFC unit 1202 operates as a target.

In step S1201, the first NFC unit 1201 performs single device detection and specifies the second NFC unit 1202. In step S1202, the first NFC unit 1201 transmits the identifier of its own, the bit transmission rate of transmission/reception, the effective data length, and the like as an attribute request. The attribute request has general purpose bytes which can arbitrarily be selected and used. Upon receiving the effective attribute request, the second NFC unit 1202 transmits an attribute response in step S1203. Transmission from the second NFC unit 1202 is done by load modulation using the RF field generated by the first NFC unit 1201. Data transmission by load modulation is expressed by a dotted arrow in FIG. 12.

After confirming the effective attribute response, the first NFC unit 1201 can change the parameters of the transmission protocol by transmitting a parameter selection request in step S1204. Parameters included in the parameter selection request are, for example, the transmission rate and the effective data length. Upon receiving the effective parameter selection request, the second NFC unit 1202 transmits a parameter selection response in step S1205 to change the parameters. Note that steps S1204 and S1205 may be omitted if parameter change is not to be performed.

In step S1206, the first NFC unit 1201 and the second NFC unit 1202 exchange data by a data exchange request and a data exchange response. In the data exchange request and response, information for an application provided in the communication partner or the like can be transmitted as data. If the data size is large, the data can divisionally be transmitted.

When the data exchange has ended, the process advances to step S1207, and the first NFC unit 1201 transmits a selection cancel request for the data exchange protocol or a release request. When the selection cancel request is transmitted, the second NFC unit 1202 transmits a selection cancel response in step S1208. Upon receiving the selection cancel response, the first NFC unit 1201 releases the attribute representing the second NFC unit 1202, and the process returns to step S1201. When the release request is transmitted, the second NFC unit 1202 transmits a release response in step S1208 and returns the initial state. Upon receiving the release response, the first NFC unit 1201 can return to the initial state because the target is completely released.

Figure 13:
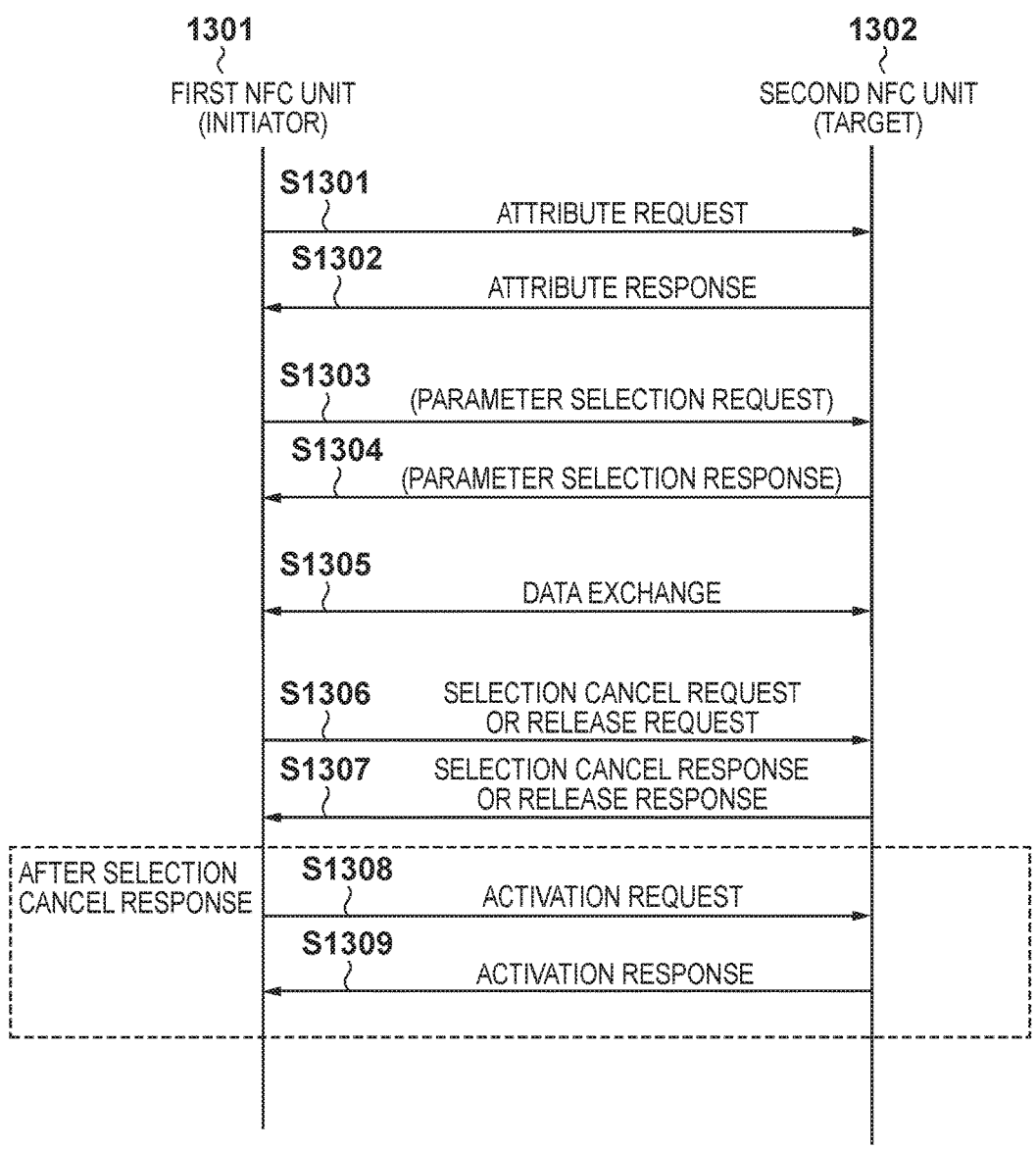
FIG. 13 is a sequence chart showing the sequence of performing data exchange in the active mode.

FIG. 13 shows the sequence including communication establishment, data exchange, and target release in the active mode. A case will be described below in which a first NFC unit 1301 operates as the initiator, and a second NFC unit 1302 operates as a target.

In step S1301, the first NFC unit 1301 transmits the identifier of its own, the bit transmission rate of transmission/reception, the effective data length, and the like as an attribute request. Upon receiving the effective attribute request, the second NFC unit 1302 transmits an attribute response in step S1302. Transmission from the second NFC unit 1302 is done by an RF field generated by itself. For this reason, each of the first and second NFC units stops outputting the RF field when ending data transmission.

After confirming the effective attribute response, the first NFC unit 1301 can change the parameters of the transmission protocol by transmitting a parameter selection request in step S1303. Parameters included in the parameter selection request are the transmission rate and the effective data length. Upon receiving the effective parameter selection request, the second NFC unit 1302 transmits a parameter selection response in step S1304 to change the parameters. Note that steps S1303 and S1304 may be omitted if parameter change is not to be performed, as in the passive mode.

In step S1305, the first NFC unit 1301 and the second NFC unit 1302 exchange data by a data exchange request and a data exchange response. In the data exchange request and response, information for an application or the like can be transmitted as data. If the data size is large, the data can divisionally be transmitted.

When the data exchange has ended, the process advances to step S1306, and the first NFC unit 1301 transmits one of a selection cancel request and a release request. When the selection cancel request is transmitted, the second NFC unit 1302 transmits a selection cancel response in step S1307. Upon receiving the selection cancel response, the first NFC unit 1301 releases the attribute representing the second NFC unit 1302. After that, in step S1308, the first NFC unit 1301 transmits an activation request to another target whose identifier is known. Upon receiving the activation request, the target transmits an activation response in step S1309, and the process returns to step S1301. When the release request is transmitted from the first NFC unit 1301 in step S1306, the second NFC unit 1302 transmits a release response in step S1307 and returns the initial state. Upon receiving the release response, the first NFC unit 1301 can return to the initial state because the target is completely released.

Figure 14:
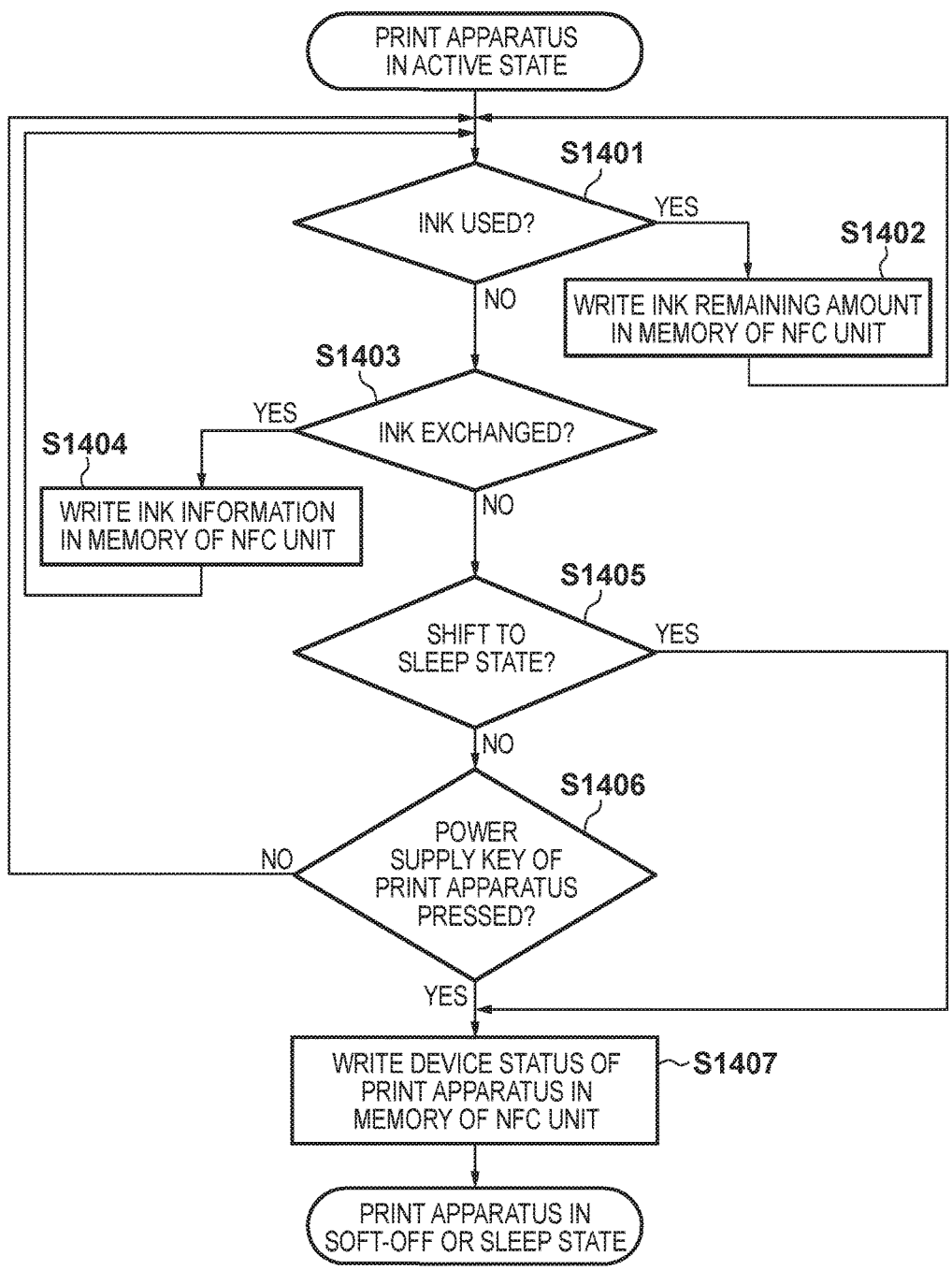
FIG. 14 is a flowchart showing processing of writing the device status of the MFP in its NFC memory.

FIG. 14 is a flowchart showing an example of processing of causing the CPU 702 of the MFP 300 to write the device status of the MFP 300 in the NFC memory 805 of the NFC unit 306 (NFC unit 718). In this embodiment, the device status of a print apparatus included in the MFP 300 is handled. A case will be described in which an ink remaining amount is used as information (device information) representing the device status. Note that the device information is not limited to the ink remaining amount, as a matter of course. The device information stored in the device status storage unit 904 shown in FIG. 9 can be included. In this embodiment, the NFC unit 306 writes the device information in the accessible NFC memory 805 in advance by power supplied to the NFC unit itself, thereby allowing the portable communication terminal 200 to read out the device information without activating the MFP 300. This can be implemented by performing data exchange in the passive mode between the NFC unit 201 (NFC unit 618) and the NFC unit 306 using the NFC unit 201 of the portable communication terminal 200 as the initiator.

The timing of writing the device information in the NFC memory 805 is preferably, for example, a timing at which the device status probably changed. An example in which an inkjet printer is incorporated as the print apparatus of the MFP 300 will particularly be described below. In steps S1401 and S1403, a timing at which a change in the device status (that is, a change in the ink remaining amount) probably occurred is detected. When the print apparatus is in the active state, the CPU 702 determines in step S1401 whether the print apparatus used the ink. If the print apparatus used the ink, the CPU 702 writes the ink remaining amount in the NFC memory (updates the ink remaining amount 1004 in the NFC memory 805) in step S1402 and returns the process to step S1401. The state in which the ink was used is a state after, for example, printing, preliminary discharge, or ink suction was performed, that is, a state in which the ink remaining amount may change. The ink remaining amount can be obtained from information recorded in the RAM 704 by the record control unit 716, as described above.

If the ink was not used, the CPU 702 determines in step S1403 whether the ink tank has been exchanged. After ink tank exchange, the ink remaining amount changes, and the model number of the ink tank and the like may also change. Hence, in step S1404, the CPU 702 writes ink information such as the ink remaining amount and the model number in the NFC memory (updates the ink remaining amount 1004 in the NFC memory 805). The write is performed at the time of detaching or attaching the ink tank. The write can be performed at either one or both of the timings. If the ink is supplied via a tube, the write may be done when the ink remaining amount changes, for example, when a sub tank is replenished with the ink. When the write of the device information has ended, the process returns to step S1401.

If ink tank has not been exchanged, the CPU 702 determines in step S1405 whether to shift the print apparatus to the sleep state. Upon determining to shift the print apparatus to the sleep state, the CPU 702 writes the device status of the print apparatus in the NFC memory in step S1407 and then shifts the print apparatus to the sleep state. The device status written here may include information such as the preceding printing end time, errors, and warnings as well as the above-described ink information. That is, the ink remaining amount 1004, the error state 1003, and the estimated next activation time 1005 in the NFC memory 805 are updated. Note that for an electrophotographic printer, a toner remaining amount, a toner cartridge model number, and the like are written in the NFC memory 805 as internal information or the device information written in the NFC memory 805 in step S1402 or S1404.

If the print apparatus is not to shift to the sleep state, the CPU 702 determines in step S1406 whether the power supply key of the MFP 300 is pressed. If the power supply key is pressed, the CPU 702 writes the device status of the print apparatus in the NFC memory in step S1407 and then shifts the MFP 300 to the soft-off state. The device status written here can be the same as in shifting to the sleep state. However, different information such as the time to shift to the soft-off state may be written. Upon determining in step S1406 that the power supply key is not pressed, the process returns to step S1401. This allows the portable communication terminal 200 to obtain the device status by communicating with the NFC unit 306 (NFC unit 718) of the print apparatus in the soft-off state or sleep state. That is, when the portable communication terminal 200 is to obtain the device status, the print apparatus need not return from the sleep state or soft-off state. It is therefore possible to decrease the number of times of operations unnecessary for obtaining the information, such as preliminary discharge.

Note that these processes need not always be performed in the order shown in FIG. 14, and not all the processes need be performed. The number of processes may be increased/decreased as needed. In this case, the device status write function is implemented by sequential processing. However, for example, event-driven processing may be performed at each conditional branch portion. In this case, the priority can arbitrarily be set.

Figure 15:
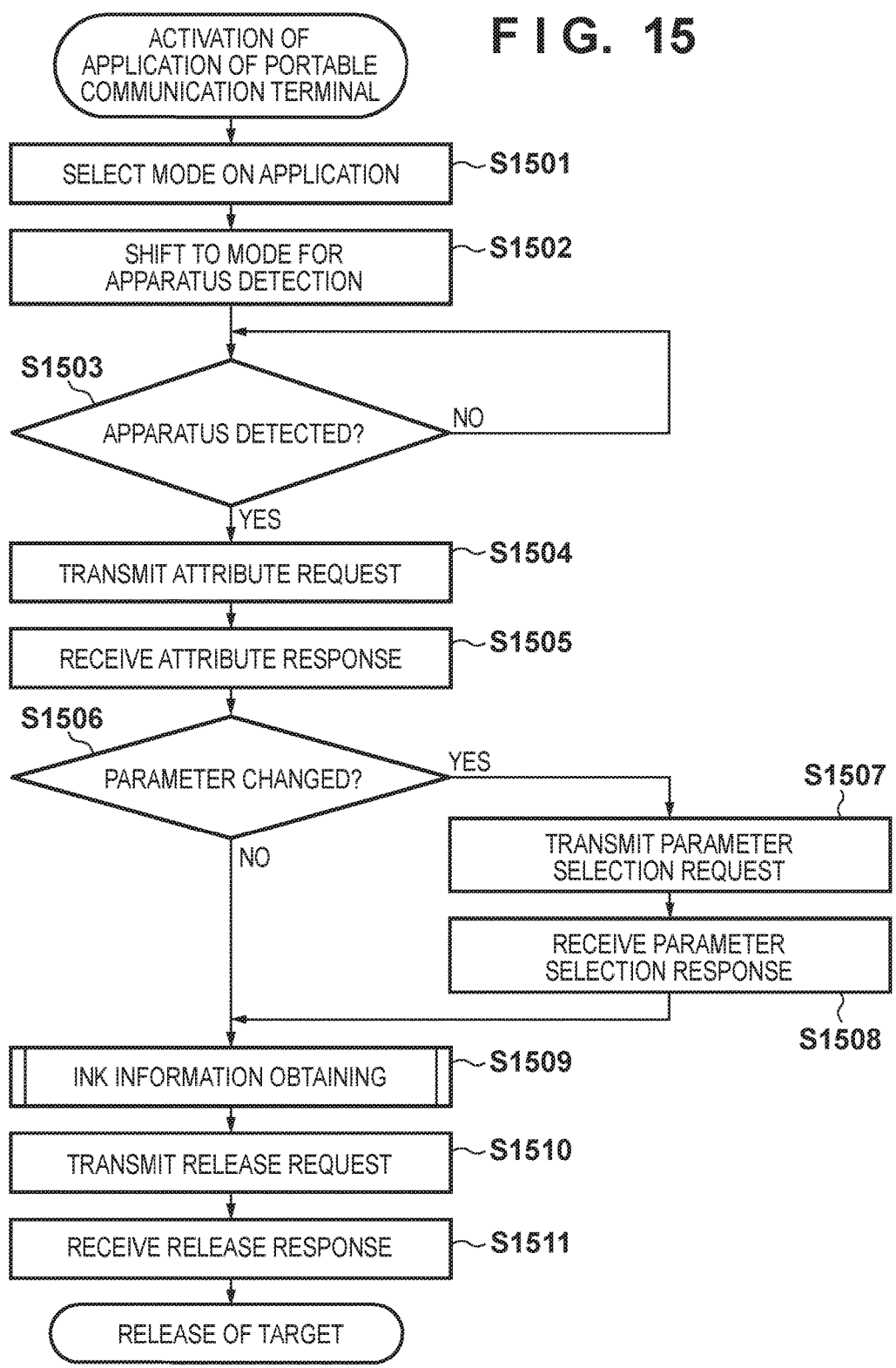
FIG. 15 is a flowchart showing processing of the portable communication terminal from activation of an application on it to the end of NFC communication.

FIG. 15 is a flowchart showing an example of processing of the portable communication terminal 200 from activation of a specific application on it to the end of NFC communication. This application obtains the ink remaining amount from the MFP 300, and has the function of a user interface used for user input and output of obtained data and a function of causing the NFC unit 201 (NFC unit 618) to operate as an initiator.

Figure 19:
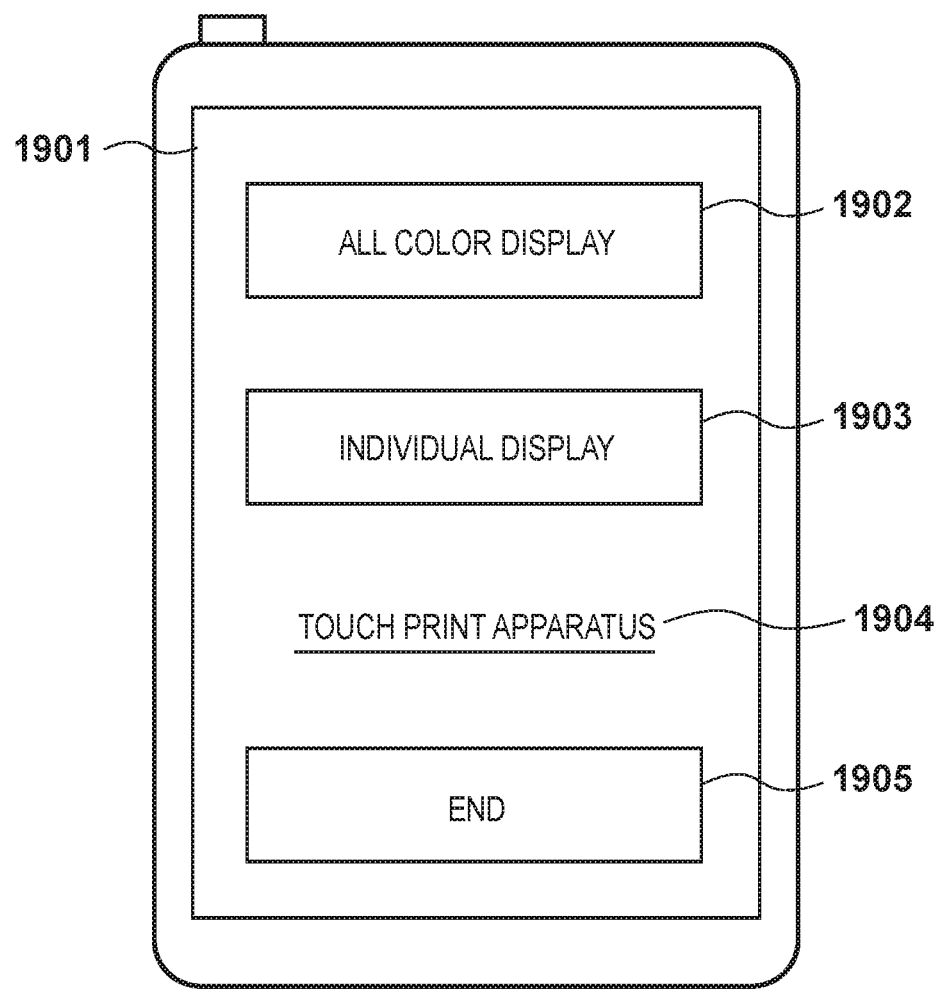
FIG. 19 is a view showing an example of a screen to perform mode selection in the portable communication terminal.

In step S1501, the CPU 602 that is executing the application of the portable communication terminal 200 selects a mode in accordance with a user designation. The mode selected here is used, for example, at the branch in step S1706 of FIG. 17 to be described later. FIG. 19 to be described later shows an example of a mode selection screen (details will be described later). Note that mode selection can be omitted. In this case, the process immediately advances to step S1502 after activation of the application.

In step S1502, the CPU 602 shifts to a mode to cause the NFC unit 201 of the portable communication terminal 200 to operate as an initiator and detect another NFC unit. That is, the NFC unit 201 serves as an initiator and operates as in steps S1101 to S1105 of FIG. 11. Note that the communication mode can be either the passive mode or the active mode. However, in the active mode, it is necessary to supply power to the NFC unit 718 of the MFP 300 even in an inactive state of the print apparatus by, for example, separating the power supply system of the NFC unit 718 and that of the print apparatus. For the operation in the active state, power needs to be supplied to the NFC unit 718. For this reason, the ink remaining amount cannot be obtained during hard-off of the MFP 300.

In step S1503, the CPU 602 detects an apparatus as the communication partner via the NFC unit 201. Upon detecting an apparatus as the communication partner, the process advances to step S1504. Otherwise, step S1503 is repeated. Note that the time or count of the apparatus search in step S1503 depends on the application. The apparatus search may be interrupted after a predetermined time or count. Alternatively, the user may select to interrupt the apparatus search.

In step S1504, the CPU 602 transmits an attribute request via the NFC unit 618. In step S1505, the CPU 602 receives an attribute response. If no correct response is obtained, the CPU 602 transmits the attribute request again or interrupts the communication. If a correct response is obtained, the process advances to step S1506.

In step S1506, the CPU 602 determines whether the parameters need to be changed. If the parameters need to be changed, the process advances to step S1507. If the parameters need not be changed, the process advances to step S1509.

In step S1507, the CPU 602 transmits a parameter selection request via the NFC unit 201. In step S1508, the CPU 602 receives a parameter selection response. If no correct response is obtained, the CPU 602 transmits the parameter selection request again or interrupts the communication. If a correct response is obtained, the process advances to step S1509.

In step S1509, the CPU 602 obtains ink information and causes the display unit 203 (display unit 610) to present it to the user. If the end of presentation is selected by, for example, user selection, the process advances to step S1510. In FIG. 15, ink information is obtained. However, information obtained here is not limited to the ink information. The device status of the print apparatus such as the time to shift the print apparatus to the sleep state or the error state 905 may be obtained. Details of the process in step S1509 will be described later with reference to FIG. 17.

In step S1510, the CPU 602 transmits a release request for the data exchange protocol. In step S1511, the CPU 602 receives a release response. Upon receiving the release response, the target is released. Hence, the CPU 602 ends the application and then ends the NFC communication.

Figure 16:
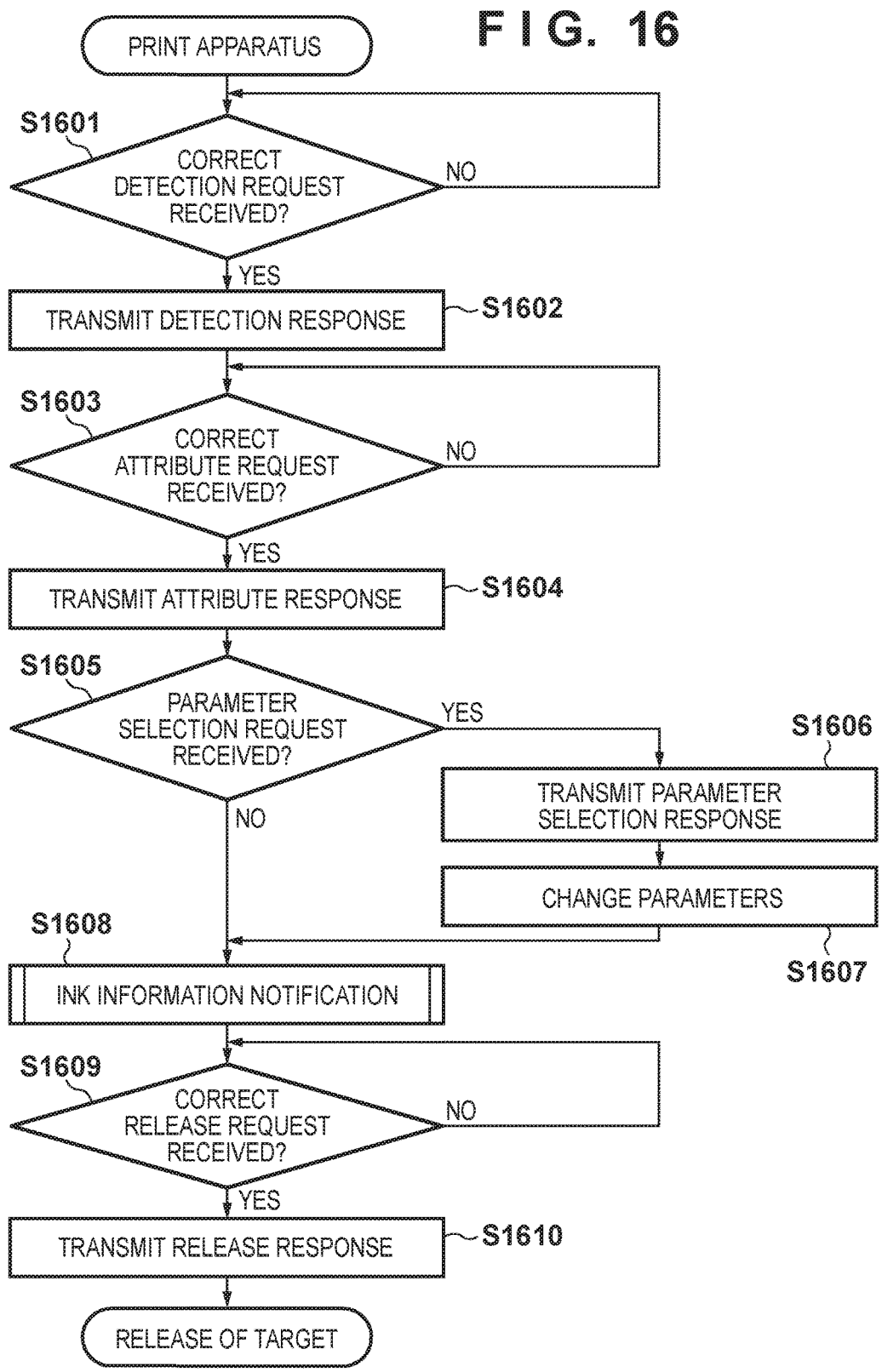
FIG. 16 is a flowchart showing the operation of the MFP from reception of a detection request from the portable communication terminal to the end of NFC communication.

FIG. 16 is a flowchart showing an example of the operation of the MFP 300 from reception of a detection request from the portable communication terminal 200 to the end of NFC communication. The communication mode can be either the passive mode or the active mode.

In step S1601, the NFC unit 306 (NFC unit 718) of the MFP 300 determines whether a detection request has been received from the NFC unit 201 of the portable communication terminal 200 serving as an initiator. Upon receiving a correct detection request, the process advances to step S1602. Otherwise, the NFC unit 306 waits for a detection request again.

After transmitting a detection response in step S1602, the NFC unit 718 receives an attribute request from the portable communication terminal 200 in step S1603. Upon receiving a correct attribute request, the process advances to step S1604. Otherwise, the NFC unit 718 waits for the attribute request again.

After transmitting an attribute response in step S1604, the NFC unit 306 receives a parameter selection request in step S1605. Upon receiving a parameter selection request, the process advances to step S1606. Otherwise, the process advances to step S1608. In step S1606, the NFC unit 306 transmits a parameter selection response. In step S1607, the NFC unit 306 changes the parameters based on the received parameter selection request. The process advances to step S1608.

In step S1608, the NFC unit 306 obtains ink information from the NFC memory 805 and notifies it. In FIG. 16, ink information is notified. However, information notified here is not limited to the ink information. The device status of the print apparatus such as the time to shift the print apparatus to the sleep state or the error state 905 may be notified. Details of the process in step S1608 will be described later with reference to FIG. 18.

In step S1609, the NFC unit 718 determines whether a correct release request has been received from the NFC unit 201 of the portable communication terminal 200. Upon receiving a correct release request, the process advances to step S1610. The NFC unit 718 transmits a release response and ends the NFC communication.

Figure 17:
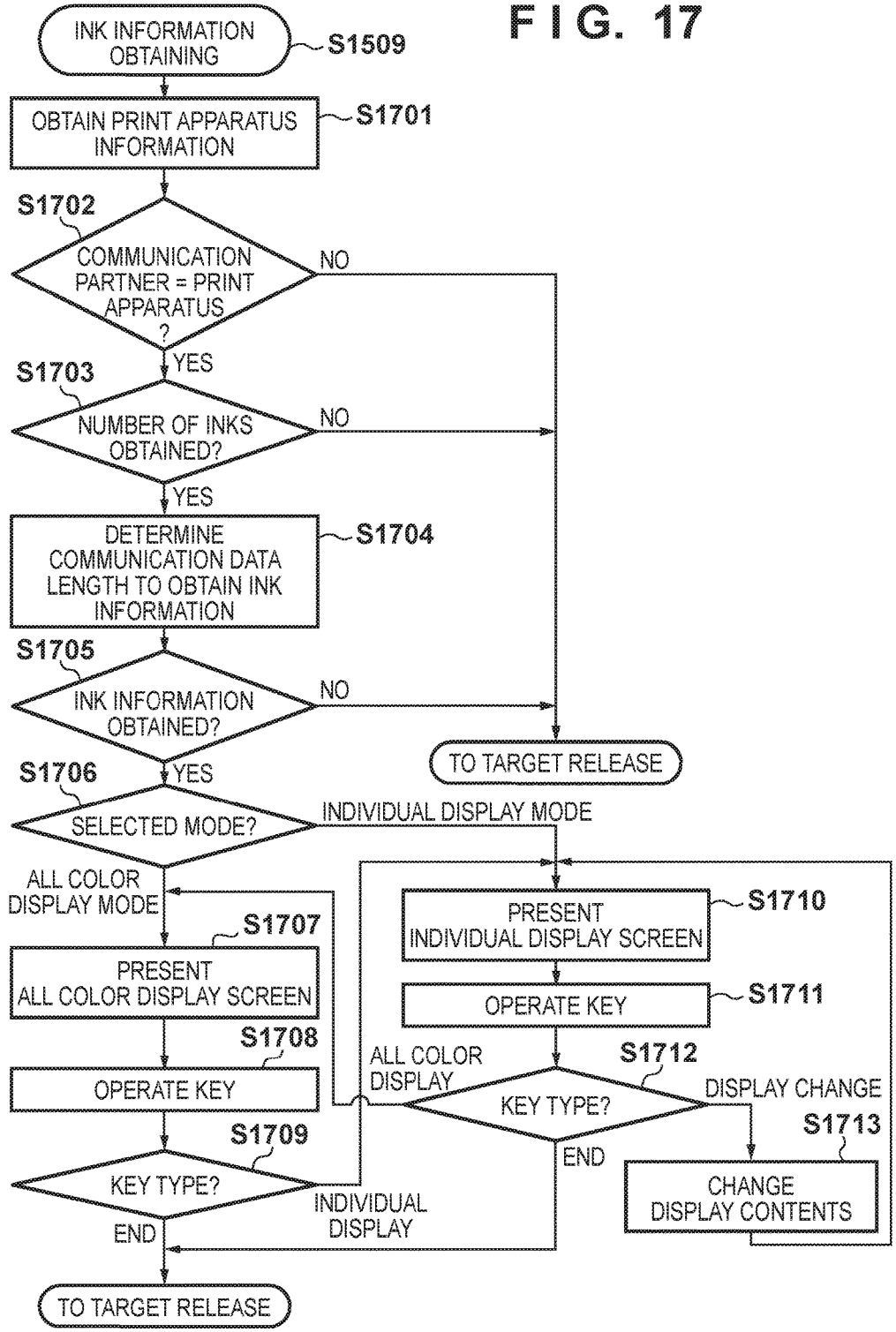
FIG. 17 is a flowchart showing an example of processing of obtaining ink information.

FIG. 17 is an example of a flowchart of processing of obtaining ink information in step S1509 of FIG. 15. Note that this processing is common to the passive mode and the active mode.

In step S1701, the CPU 602 of the portable communication terminal 200 serving as an initiator obtains, using the NFC unit 201, the information of the print apparatus from the NFC memory 805 of the NFC unit 306 of the MFP 300 serving as a target. In step S1702, the CPU 602 determines based on the information obtained here whether the communication partner is the print apparatus (MFP 300) corresponding to the application. That is, the information of the print apparatus communicated here includes data representing that the print apparatus is the MFP 300 corresponding to the above-described application of the portable communication terminal 200. If the communication partner is the MFP 300 corresponding to the application of the portable communication terminal 200, the process advances to step S1703. Otherwise, the process advances to processing of ending the NFC communication.

In step S1703, the CPU 602 determines whether the number of inks provided in the print apparatus of the MFP 300 as the communication partner has been obtained. The number of inks can be either included in the print apparatus information obtained in step S1701 or obtained by communicating again. If the number of inks has been obtained, the process advances to step S1704. Otherwise, the process advances to processing of ending the NFC communication.

In step S1704, the CPU 602 decides, from the obtained number of inks, a data length to obtain ink information. If a data area calculated based on the data length cannot be allocated in the memory of the portable communication terminal, exception processing of, for example, ending the NFC communication may be performed. In step S1705, the CPU 602 requests the ink information via the NFC unit 618 and determines whether the ink information has correctly been obtained. If the ink information has correctly been obtained, the process advances to step S1706. Otherwise, the process advances to processing of ending the NFC communication.

In step S1706, the processing branches depending on the mode selected in step S1501 of FIG. 15. An example is shown here in which an all color display mode and an individual display mode exist, as will be described later with reference to FIG. 19. In the all color display mode, the process branches to step S1707. In the individual display mode, the process branches to step S1710.

Figure 20:
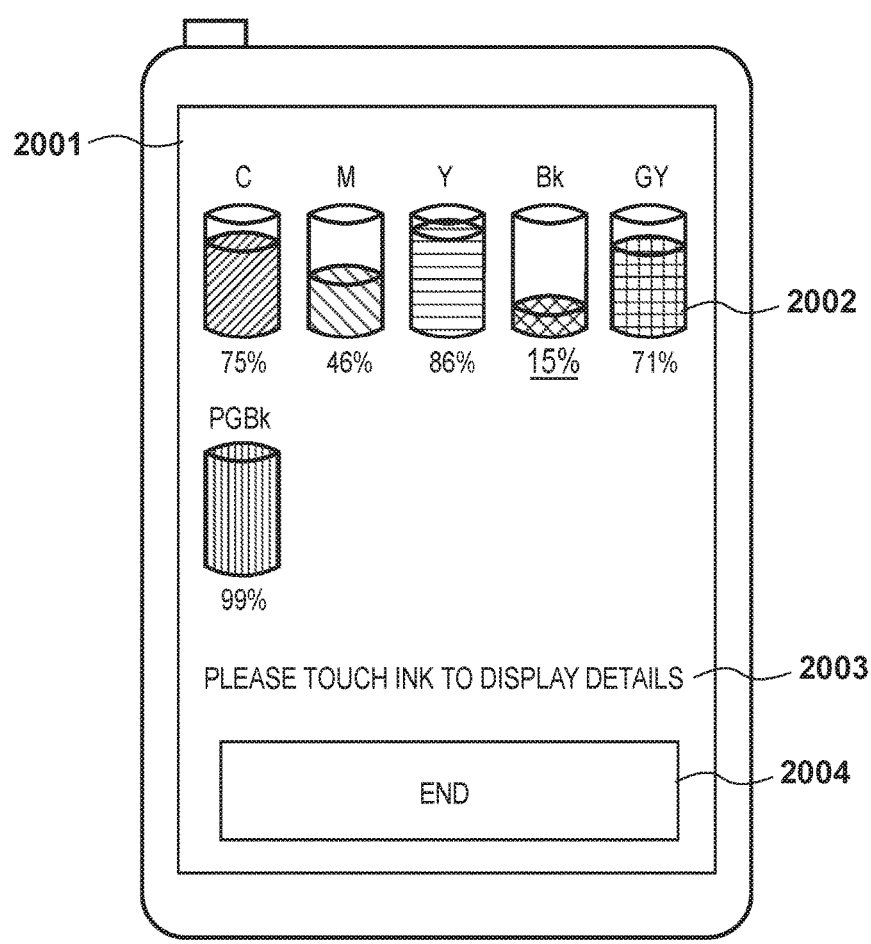
FIG. 20 is a view showing an example of the screen of the portable communication terminal to perform all color display.

In step S1707, the CPU 602 presents the user, for example, an all color display screen as shown in FIG. 20 to be described later. Upon detecting a key operation on the operation unit 204 in step S1708, the CPU 602 determines the type of the operated key in step S1709. If the selected key is the individual display key, the process advances to step S1710. If the selected key is the end key, the process advances to processing of ending the NFC communication. For any other key, screen presentation is continued, or an operation predetermined by the portable communication terminal 200 or application is performed.

Figure 21:
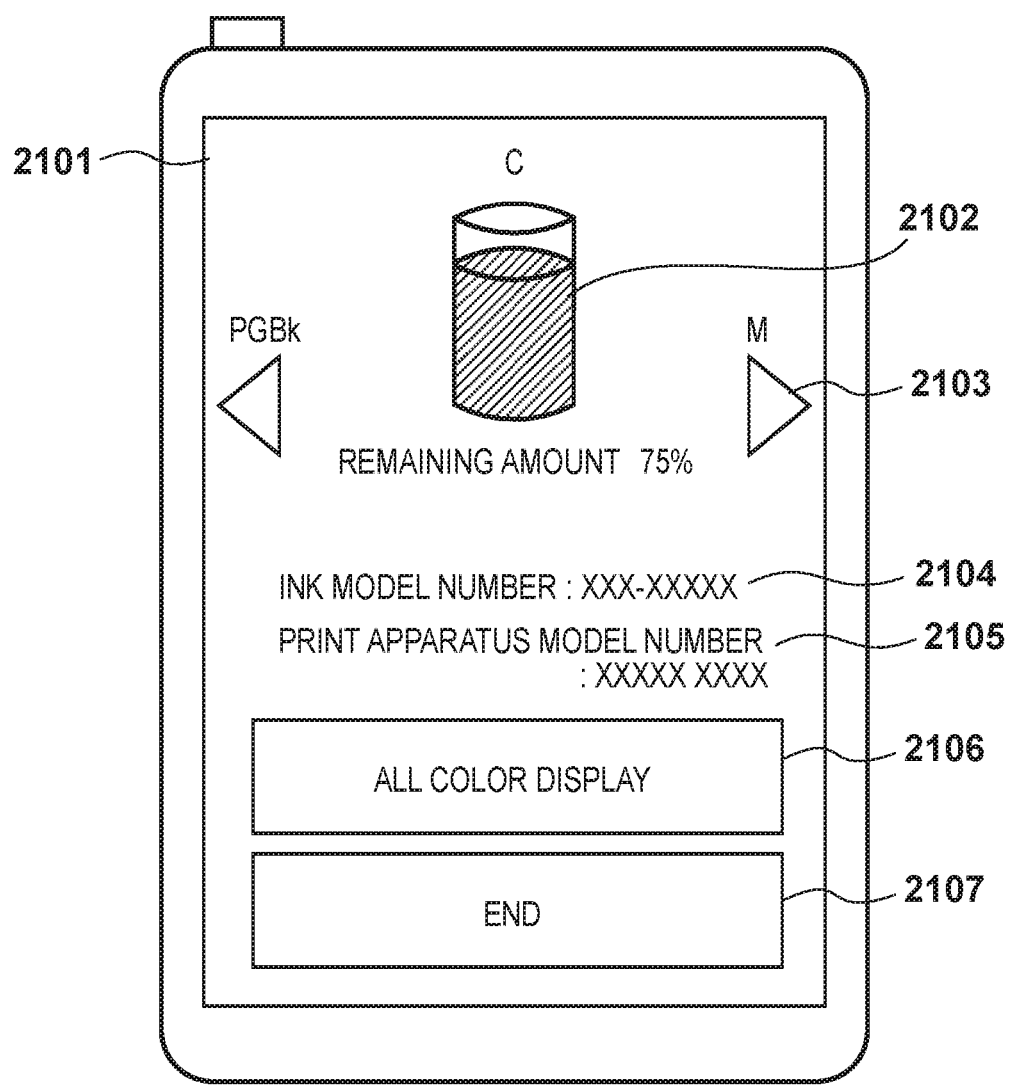
FIG. 21 is a view showing an example of the screen of the portable communication terminal to perform individual display.

In step S1710, the CPU 602 presents the user, for example, an individual display screen as shown in FIG. 21 to be described later. Upon detecting a key operation on the operation unit 204 in step S1711, the CPU 602 determines the type of the operated key in step S1712. If the selected key is the all color display key, the process advances to step S1707. If the selected key is the display change key, the process advances to step S1713. If the selected key is the end key, the process advances to processing of ending the NFC communication. For any other key, screen presentation is continued, or an operation predetermined by the portable communication terminal or application is performed. In step S1713, the CPU 602 changes the individually displayed ink information to ink information of another color. The process advances to step S1710, and the CPU 602 updates the individual display screen in accordance with the changed contents.

Note that the flowchart described above is merely an example, and the order and contents of the processes may arbitrarily be changed. For example, screen presentation on the portable communication terminal 200 may be done after the end of NFC communication. In addition, the number of types of display modes in the screen presentation on the portable communication terminal 200 may be increased/decreased (one fixed display mode may be used, or one of three or more display modes may be selected). The apparatus serving as an initiator need not always be the portable communication terminal, and information to be obtained is not limited to ink information of the print apparatus.

Figure 18:
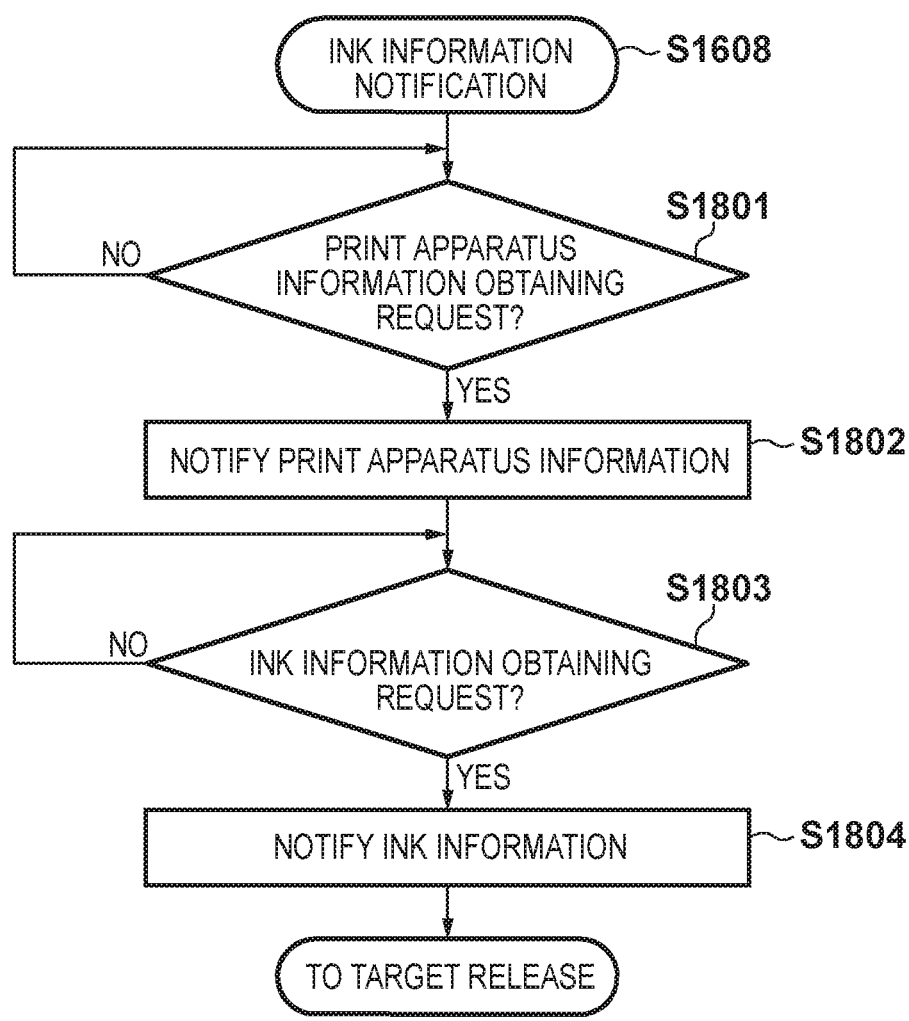
FIG. 18 is a flowchart showing an example of processing of notifying ink information.

FIG. 18 is a flowchart showing an example of processing (step S1608 of FIG. 16) of notifying ink information by the NFC unit 618 of the MFP 300. Note that in FIG. 18, activation processing of the MFP 300 is not performed.

In step S1801, the NFC unit 306 of the MFP 300 waits for a request to obtain print apparatus information to be transmitted from the initiator (in this example, the NFC unit 201 of the portable communication terminal 200). Upon receiving a correct request, the process advances to step S1802, and the NFC unit 306 reads out the print apparatus information from the NFC memory 805 of its own and notifies the initiator of it.

In step S1803, an ink information obtaining request is received. Upon receiving a correct request, the process advances to step S1804, and the NFC unit 306 reads out the ink information from the NFC memory 805 of its own and notifies the initiator of it. When the ink information notification has ended, the process advances to processing of ending the NFC communication. The pieces of information notified in these processes are not limited to those described above and can arbitrarily be determined.

Note that in FIG. 18, the NFC unit 306 can transmit the state information such as the ink remaining amount of the MFP 300 to the NFC unit 201 of the portable communication terminal 200 without activating the MFP 300. It is therefore possible to transmit the state information even if the MFP 300 is in the hard-off state. Even when the MFP 300 is in the soft-off state or sleep state, it is possible to transmit the state information without waiting for activation of the MFP 300.

Note that in the processing shown in FIG. 18, the MFP 300 may be activated. For example, when the NFC unit 306 has received a print processing request from the portable communication terminal 200, the NFC unit 306 may transmit the state information by the processing shown in FIG. 18 and activate the MFP 300 so as to execute printing, and the MFP 300 may execute the processing in accordance with activation.

FIG. 19 shows an example of a screen to perform mode selection on the application of the portable communication terminal 200 in step S1501 of FIG. 15. As described above, this application has the function of a user interface used for user input and output of obtained data and a function of causing the NFC unit 201 to operate as an initiator.

A mode selection screen 1901 includes an all color display key 1902, an individual display key 1903, and an end key 1905. The all color display key 1902 corresponds to the all color display mode, and the individual display key 1903 corresponds to the individual display mode. The selection state of each mode is referred to at the branch in step S1706 of FIG. 17. In accordance with selection of one of the all color display key 1902 and the individual display key 1903, the CPU 602 causes the NFC unit 201 to start operating as an initiator (step S1502). After causing the NFC unit 201 to start operating as an initiator in accordance with an instruction from the application, the CPU 602 displays, on the mode selection screen 1901, a message 1904 to notify the user that preparation for communication with the print apparatus is completed. When the end key 1905 is selected, the application ends. Before the end of the application, a message to confirm again whether to end and a selection key may be displayed. Note that these keys and messages are merely examples, and the items, display contents, positions, and the like may arbitrarily be determined.

FIG. 20 shows an example of the screen of the portable communication terminal to perform all color display in step S1707 of FIG. 17.

Referring to FIG. 20, an all color display screen 2001 includes ink remaining amount information 2002, a message 2003 to notify the method of transiting to an individual display screen 2101, and an end key 2004. The ink remaining amount information 2002 includes an ink color name, an illustration of the remaining amount, and a numerical value representing the remaining amount. Pieces of ink remaining amount information corresponding to the respective ink colors are divisionally shown. When the desired ink remaining amount information 2002 is selected, the screen transits to the individual display screen 2101 as shown in FIG. 21 corresponding to the selected ink color. When the end key 2004 is selected, the application ends, and the target is released. Before the end of the application, a message to confirm again whether to end and a selection key may be displayed. Note that the ink remaining amount information 2002, the message 2003, and the end key 2004 are merely examples, and the manner and contents of display, and the like may arbitrarily be changed.

FIG. 21 shows an example of the screen of the portable communication terminal to perform individual display in step S1710 of FIG. 17.

Referring to FIG. 21, the individual display screen 2101 includes ink remaining amount information 2102, a display change key 2103, an ink model number 2104, a print apparatus model number 2105, an all color display key 2106, and an end key 2107.

The ink remaining amount information 2102 includes an ink color name, an illustration of the remaining amount, and a numerical value representing the remaining amount. This can be the same as the ink remaining amount information 2002 shown in FIG. 20 or different. When the display change key 2103 is selected, the currently displayed ink information is changed to the ink information of another color. The display change key 2103 is merely an example, and may correspond to a slide operation on the touch panel or may be changed by a thumbnail or the like.

The ink model number 2104 and the print apparatus model number 2105 are items displayed only on the individual display screen. Although the ink model number and the print apparatus model number have been exemplified above, these items may arbitrarily be changed.

When the all color display key 2106 is selected, the screen transits to the all color display screen 2001 as shown in FIG. 20. When the end key 2107 is selected, the application ends. Before the end of the application, a message to confirm again whether to end and a selection key may be displayed.

Note that the contents and arrangement of the keys are merely examples and may arbitrarily be changed as needed.

As described above, according to the embodiment, state information representing the device status of the print apparatus is recorded in a storage medium externally readable by NFC. For this reason, when obtaining the device status of the print apparatus whose power supply is in the hard-off, soft-off, or power saving mode, the print apparatus need not be activated. It is therefore unnecessary to wait for activation of the print apparatus. Especially when the print apparatus is an inkjet printer, preparation for printing such as preliminary ink discharge to be executed at the time of activation need not be performed. It is therefore possible to reduce unnecessary ink consumption.

In the above-described embodiment, short distance communication using NFC has been exemplified. However, the present invention is not limited to this. Although NFC is used as the short distance communication, any other communication method may be used. For example, infrared communication (IrDA) or the like may be used. In this case, the infrared communication unit on the side of the MFP 300 needs to be configured to communicate by power supplied from a power supply system different from a power supply system whose power supply is cut off by soft-off or the like, like NFC in the active mode.

As the communication partner of the portable communication terminal 200, the MFP 300 (print apparatus) has been exemplified. As the device status information not be obtained, the ink remaining amount, the model number of the attached ink tank, and the like have been exemplified. However, the present invention is not limited to those. For example, short distance wireless communication as described in the embodiment may be executed between the portable communication terminal 200 and a video recorder that records a TV program, and the programming state of the video recorder may be obtained as the device information. This arrangement enables to conveniently confirm the programmed program without activating the video recorder (keeping the video recorder off).

Note that in the above-described embodiment, the MFP may write status information such as the ink remaining amount in the memory at various timings. The status information may be written when, for example, powering off the MFP. Alternatively, error information may be written at a timing corresponding to an error condition such as a low ink level. In this case, if the error is solved by ink exchange or the like, the error information is deleted from the memory.

The status information is not limited to the ink remaining amount, and various kinds of information may be written.

In the above-described embodiment, the MFP has been exemplified as the apparatus. However, the present invention is not limited to this, and various apparatuses capable of communicating by NFC, such as a PC and a camera, may also be used.

In the above-described embodiment, as the method of notifying the device status, display has been exemplified. However, various notification methods such as printing and sound generation can be employed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

The program may be executed by one computer, or a plurality of computers may execute the program cooperatively. Hardware such as a circuit for executing part of the program may be provided, and the hardware and a computer that executes software may cooperatively execute the processing described in the embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-048614, filed Mar. 5, 2012, which is hereby incorporated by reference herein in its entirety.

What is claimed is:

1. A method for a system including a mobile device and a printer to which a container containing a recording material for printing of an image by the printer is attached,
    wherein the printer comprises:
    a first processor;
    a first communication device configured to execute wireless communication by using a predetermined communication method; and
    a storage device, and
    the mobile device comprises:
    a second processor;
    a second communication device configured to execute wireless communication by the predetermined communication method; and
    a display device,
    wherein the method comprises:
    storing, by the first processor, predetermined information in the storage device, in a case where the container is operated;
    newly displaying, by the second processor, in a case where the second communication device executes wireless communication with the first communication device after a first display item is designated by a user on the display device, a first display content which includes a predetermined display item, using the display device based on the predetermined information which the mobile device acquires from the storage device; and
    newly displaying, by the second processor, in a case where the second communication device executes communication with the first communication device after a second display item is designated by the user on the display device, a second display content which does not include the predetermined display item, using the display device.

2. The method according to claim 1, further comprising updating, by the first processor, the predetermined information stored in the storage device, in accordance with a change in the amount of the recording material contained in the container.

3. The method according to claim 1, wherein the recording material is ink used for printing by the printer, and the container is an ink tank.

4. The method according to claim 1, further comprising transmitting the predetermined information from the first communication device to the second communication device via wireless communication by the predetermined communication method.

5. The method according to claim 1, wherein the predetermined information includes amount information indicating the amount of the recording material contained in the container.

6. The method according to claim 5, wherein the first display content and the second display content include a remaining amount of the recording material contained in the container, in a different manner based on the predetermined information.

7. The method according to claim 1, wherein the first display content and the second display content are displayed in a different manner based on the predetermined information.

8. The method according to claim 1, further comprising causing, by the second processor, the display device to display predetermined display item for prompting a user to put the mobile device close to the printer, after the first display item or the second display item is designated by the user on the display device.

9. The method according to claim 1, wherein the predetermined information includes model number information indicating a model number, and the predetermined display item indicates the model number.

10. The method according to claim 9, wherein the model number is a model number of the printer.

11. The method according to claim 9, wherein the recording material is ink used for printing by the printer, and the container is an ink tank, and the model number is a model number of the ink tank.

12. The method according to claim 1, wherein the first display item and the second display item are displayed by an application executed by the second processor.

13. The method according to claim 12, wherein both of the first display item and the second display item are displayed concurrently on a same screen by the application.

14. The method according to claim 12, wherein at least one of the first display content and the second display content is displayed by the application.

15. A method for a mobile device which executes wireless communication with a printer by a predetermined communication method,
wherein a container containing a recording material for printing of an image by the printer, is attached to the printer, and
the printer comprises a storage device, and a first processor configured to store predetermined information in the storage device, in a case where the container is operated,
wherein the method comprises:
newly displaying, by a second processor of the mobile device, in a case where the mobile device executes wireless communication with the printer by the predetermined communication method after a first display item is designated by a user on a display device of the mobile device, a first display content which includes a predetermined display item, using the display device based on the predetermined information which the mobile device acquires from the storage device; and
newly displaying, by the second processor, in a case where the mobile device executes wireless communication with the printer after a second display item is designated by the user on the display device, a second display content which does not include the predetermined display item, using the display device.

16. The method according to claim 15, further comprising acquiring the predetermined information via wireless communication by the predetermined communication method.

17. The method according to claim 15, further comprising causing, by the second processor, the display device to display a predetermined display item for prompting a user to put the mobile device close to the printer, after the first display item or the second display item is designated by the user on the display device.

18. The method according to claim 15, wherein the first display item and the second display item are displayed by an application executed by the second processor.

19. The method according to claim 18, wherein both of the first display item and the second display item are displayed concurrently on a same screen by the application.

20. A system including a mobile device and a printer to which a container containing the recording material for printing of an image by the printer is attached,
wherein the printer comprises:
a first processor;
a first communication device configured to execute wireless communication by using a predetermined communication method; and
a storage device, and
the mobile device comprises:
a second processor;
a second communication device configured to execute wireless communication by the predetermined communication method; and
a display device,
wherein the first processor stores predetermined information in the storage device, in a case where the container is operated,
wherein, in a case where the second communication device executes wireless communication with the first communication device after a first display item which is selectable on the display device is designated by a user, the mobile device causes the display device to newly display a first display content which includes a predetermined display item, based on the predetermined information which the mobile device acquires from the storage device, and
in a case where the second communication device executes communication with the first communication device after a second display item which is selectable on the display device is designated by the user, the mobile device causes the display device to newly display a second display content which does not include the predetermined display item.

21. The method according to claim 1, wherein the first processor stores the predetermined information in the storage device, in a case where the container is attached to the printer.

22. The method according to claim 1, wherein the first processor stores the predetermined information in the storage device, in a case where the container is detached from the printer.

23. The method according to claim 1, wherein the predetermined communication method is NFC (Near Field Communication).

24. The system according to claim 20, wherein the first processor stores the predetermined information in the storage device, in a case where the container is attached to the printer.

25. The system according to claim 20, wherein the first processor stores the predetermined information in the storage device, in a case where the container is detached from the printer.

26. The system according to claim 20, wherein the predetermined communication method is NFC (Near Field Communication).

27. The method according to claim 15, wherein the predetermined communication method is NFC (Near Field Communication).

* * * * *